(12) United States Patent
Tone

(10) Patent No.: US 7,336,395 B2
(45) Date of Patent: Feb. 26, 2008

(54) DATA CONVERSION SYSTEM, IMAGE PROCESSING AND IMAGE FORMING APPARATUS

(75) Inventor: Takeharu Tone, Tokyo (JP)

(73) Assignee: Ricoh Co., Ltd., Tokyo (JP)

( * ) Notice: Subject to any disclaimer, the term of this patent is extended or adjusted under 35 U.S.C. 154(b) by 794 days.

(21) Appl. No.: 10/735,711

(22) Filed: Dec. 16, 2003

(65) Prior Publication Data

US 2004/0169874 A1  Sep. 2, 2004

(30) Foreign Application Priority Data

Dec. 16, 2002  (JP)  .............................. 2002-363595

(51) Int. Cl.
*G06K 1/00* (2006.01)
*H04N 1/60* (2006.01)
(52) U.S. Cl. ........................ 358/1.9; 358/2.1; 358/519; 358/521; 358/3.23; 358/448; 358/515; 382/162
(58) Field of Classification Search ................. 358/1.9, 358/2.1, 519, 521, 3.23, 448, 3.26, 515; 382/162
See application file for complete search history.

(56) References Cited

U.S. PATENT DOCUMENTS 6,115,138 A * 9/2000 Yanaka ........................ 358/1.9
6,271,868 B1  8/2001 Kashihara

FOREIGN PATENT DOCUMENTS

| EP | 0 506 144 | 9/1992 |
| EP | 0 644 686 | 3/1995 |
| JP | 08-018826 | 1/1996 |
| JP | 10-145806 | 5/1998 |
| JP | 2000-083171 | 3/2000 |
| JP | 2000-184236 | 6/2000 |

* cited by examiner

*Primary Examiner*—King Y. Poon
*Assistant Examiner*—Quang N. Vo
(74) *Attorney, Agent, or Firm*—Oblon, Spivak, McClelland, Maier & Neustadt, P.C.

(57) ABSTRACT

Disclosed is a system of image data conversion, capable of setting conversion characteristics with more ease even for data having mixed image attributes, and of reducing the amount of data and the size of memory required. The conversion system includes processing elements in a processor array, each including at least an input data register, character registers, an attribute register, and a global processor, so that a calculator in each of the processing elements operates to select, and store in the character registers, the data set, $x_i$, $y_i$, and $a_i$, corresponding to attribute data stored in the attribute register, to be conversion processed subsequently according to an expression stored in the global processor. The global processor assume overall control such as writing raster image data x into each of processing elements corresponding to each attribute data from a data memory to character registers, imparting an operation instruction set to each calculator for performing the data conversion, and outputting conversion processed data $y_i$ written into an output register.

44 Claims, 22 Drawing Sheets

| FIG. 7A |
| FIG. 7B |

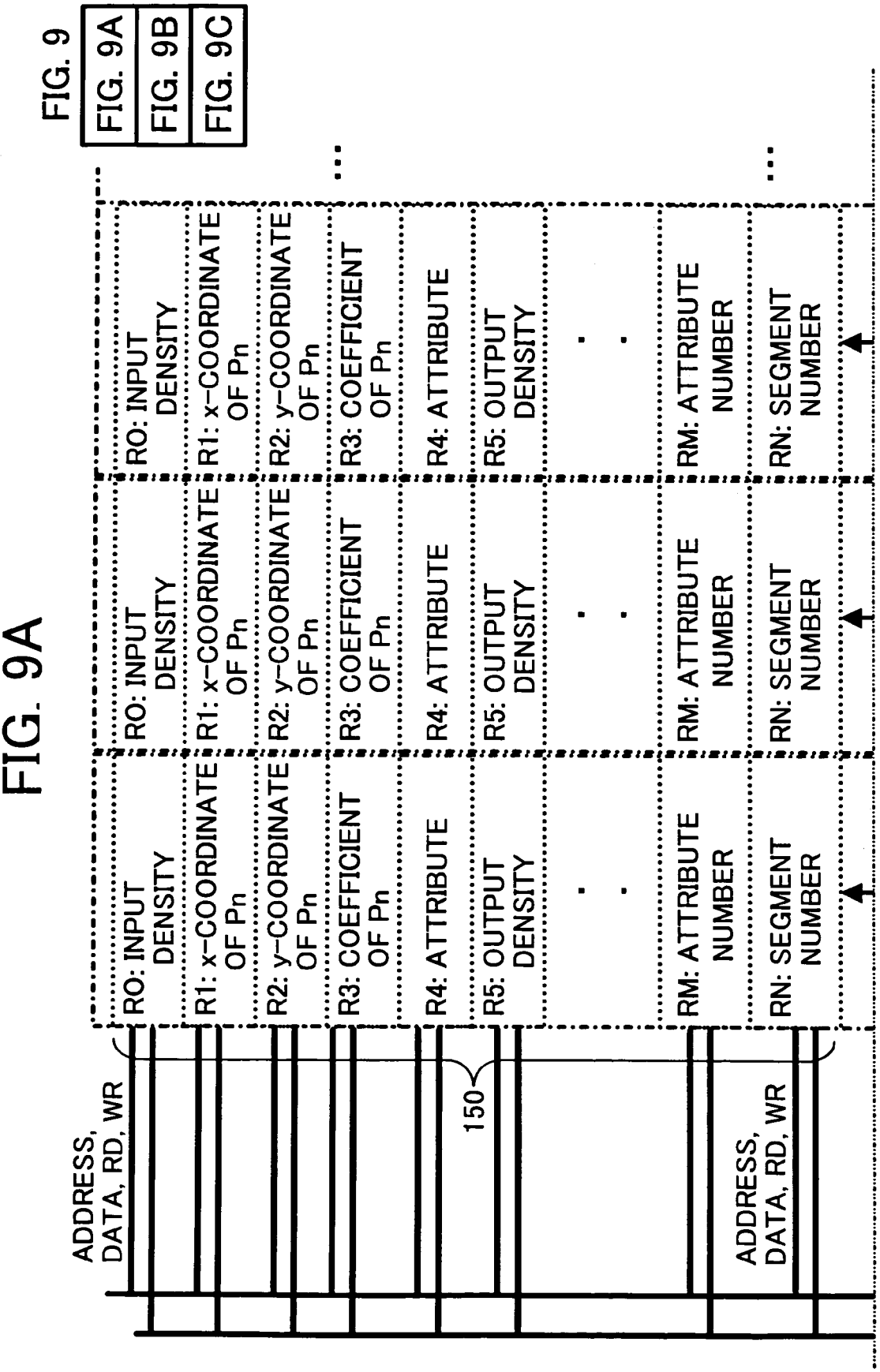

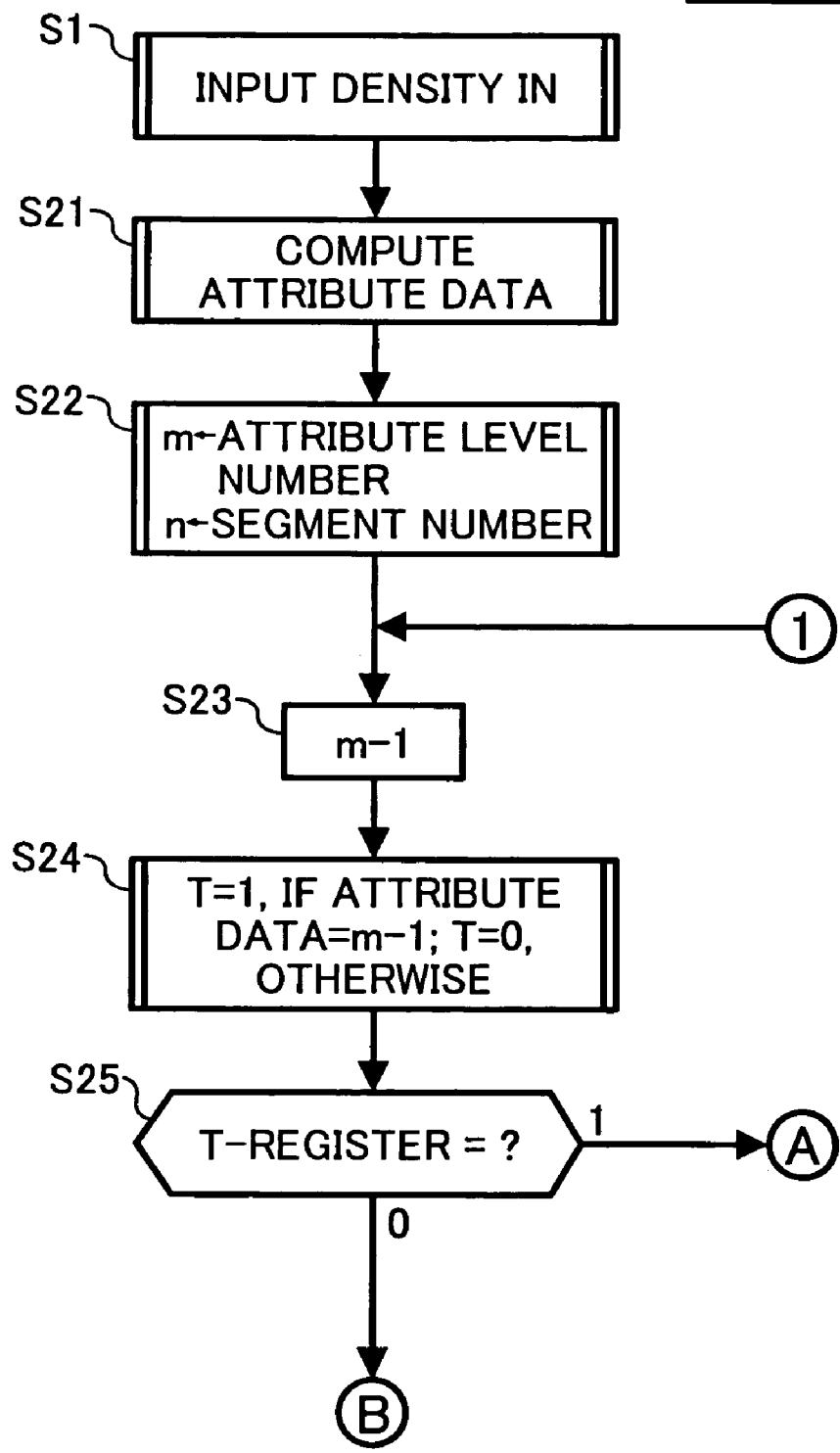

FIG. 15B

```
COODINATE DATA : COEFFICIENT DATA
- - - - - - - - - - - - - - - - - - - - - - - - - - - - - -
        P₀ (x₀ , y₀) : a₀
        P₁ (x₁ , y₁) : a₁
        P₂ (x₂ , y₂) : a₂
        P₃ (x₃ , y₃) : a₃
        P₄ (x₄ , y₄) : a₄
        P₅ (x₅ , y₅) : a₅
        P₆ (x₆ , y₆) : a₆
        P₇ (x₇ , y₇) : a₇
        P₈ (x₈ , y₈) :
```

FIG. 15C

OUTPUT DENSITY = int {$a_4$* (INPUT DENSITY$-x_4$)+$y_4$}

FIG. 15D

| L3 | L2 | L1 | CC | U1 | U2 | U3 |
|---|---|---|---|---|---|---|
| −3 | −2 | 2 | 4 | 2 | −2 | −3 |

DATA CONVERSION SYSTEM, IMAGE PROCESSING AND IMAGE FORMING APPARATUS

BACKGROUND

1. Field

This patent specification relates to a system and a method of gradation conversion of multi-valued data, capable of setting conversion characteristics with more ease even for data having mixed image attributes and reducing the amount of data and the size of memory required, and image processing and image forming apparatus incorporating the conversion system.

2. Discussion of the Background

The gradation conversion described herein is in use for read gamma conversion, print gamma conversion and other similar conversions.

The read gamma conversion is utilized for correcting, and changing to desired image representation, the image data acquired by a document scanner or digital camera with respect to distortion caused by, for example, imaging characteristics of imaging device, or of changing the image data.

In addition, the print gamma conversion is used for altering the brightness, contrast or color of CG (computer graphics) images, and/or of changing image data or CG data to be the image data which are compatible with the representation characteristics of a printer and suitable for output record.

The above noted examples are intended to be illustrative but not limiting the scope of the present disclosure.

Several methods have been disclosed previously on the gamma-correction, in which output densities corresponding to input densities are once stored in an external memory for the entire range of density and which an output density of current interest is obtained by reading out the density at the corresponding input density address among the stored densities.

In these methods, however, there encountered several drawbacks such as a large amount of memory data required and insufficient flexibility for adopting the change of gamma curve.

The use of polygonal lines to approximate the density curve is disclosed in Japanese Laid-Open Patent Application No. 8-18826, in which a digital gamma conversion circuit is proposed to perform gamma conversion for correcting video signals to adapt display characteristics (gamma curve) of display device utilizing the polygonal line in place of LUT (Look Up Table) and obtain corrected image data after the computation with the polygonal line, so that gamma characteristics can be altered in real time.

Another method of gamma conversion is disclosed in Japanese Laid-Open Patent Application No. 10-145806. In this method, the change or modification of the gamma conversion is carried out by storing plural sets of gamma conversion data in LUT, generating set(s) of gamma conversion data that are different from the plural sets in LUT, writing the set(s) into RAM and utilizing the RAM for the conversion.

Furthermore, a gamma conversion circuit is disclosed in Japanese Laid-Open Patent Application No. 2000-184236, in which gamma conversion is performed by approximating gamma conversion characteristics to a polygonal line and performing the gamma conversion on input video data V0 using a linear expression, $Vc=a \cdot V0+b$.

Although several conversions on data can be cited in general such as correction of RGB image data (scanner and read gamma corrections), color conversion from RGB to YMCK, correction of YNCK image data (for example, printer gamma conversion) and so on, it is preferable for the conversion to be provided with the capability of such as, for example, switching or adjusting its correction and conversion characteristics.

When one process mode is designed to be selected from plural process modes to satisfy the requirement from the conversion characteristics, processing data of these plural process modes have to be prepared, so that the amount of data to be processed further increases.

For example, three LUTs are utilized, i.e., one for each of RGB colors, in the case of the read gamma conversion. And, since four LUTs for YMCK colors are similarly used for the printer gamma conversion, the amount of data in the LUTs amounts to that multiplied by '4×a', if a plurality, 'a' kinds, of LUTs are prepared.

In order to reduce the amount of data and the size of memory to be prepared for gamma conversion, and further to facilitate the change of gamma conversion characteristics, the present inventor has disclosed (Japanese Laid-Open Patent Application No. 2000-83171) a system for performing gamma conversion simultaneously on a large number of image data on one single raster through the computation adopting a set of linear approximation expressions using SIMD (Single Instruction stream Multi-Data stream) processor.

In the case when specified data conversion characteristics are converted according to several data conversion characteristics prepared beforehand, it is preferable to affix attribute data to the data to be converted and select suitable data conversion characteristics corresponding to the attribute data.

For example, in the gamma conversion of the image data acquired by a document scanner (scanner gamma conversion) and the print gamma conversion for fitting for representation characteristics of the printer on which the image data are to be printed out, gamma conversion characteristics may be selected preferably based on the attributes of either character and line drawing (binary image) or photograph (mesh dot image).

That is, for the binary image, gamma conversion characteristics capable of enhancing the contrast of images are selected corresponding to the attribute for binary image. For the mesh dot image, in contrast, gamma conversion characteristics capable of smoothing the density change are selected corresponding to the attribute for mesh dot image.

When plural kinds of LUTs in use for the gamma conversion are so prepared in the memory area so as to satisfy the requirement from the conversion-characteristics, the size required in memory has to become enormous.

It is highly preferable, therefore, to reduce the amount of required data by carrying out the conversion method for simultaneously gamma converting the large number of image data on one single raster through the computation adopting a set of linear approximation expressions using SIMD processors.

SUMMARY

Accordingly, it is an object of this invention to facilitate the setting of conversion characteristics corresponding to attribute with more ease even for data having mixed image attributes in a data processing apparatus disclosed herein.

It is a further object to reduce the amount of data and the size of memory required for the data conversion.

The following description is a synopsis of only selected features and attributes of the present disclosure. A more complete description thereof is found below in the section entitled "Description of the Preferred Embodiments."

To achieve the foregoing and other objects, the data processing apparatus disclosed herein includes a data memory for storing characteristic definition data defined for each data attribute; a plurality of processing elements each for selecting a set of characteristic definition data from the characteristic definition data stored in the data memory corresponding to each data and each data attribute out of a data stream to be processed, and perform a processing of each data according to the group of characteristic definition data; and a process control means for storing process control data for controlling processing of each data, imparting an operation instruction set based on the process control data to each of the plurality of processing elements in common, imparting each of the data stream to each of the plurality of processing elements, sending out the characteristic definition data stored in the data memory corresponding to each attribute data stored on the data memory to each of the plurality of processing elements, and outputting processed data from each of the plurality of processing elements.

The process control means in the data processing apparatus includes a global register for storing, and imparting the process control data for controlling processing of each data to each of the plurality of processing elements in common; and a processor for assuming control of writing the process control data into the global register, imparting each of the data stream to each of the plurality of processing elements, sending out the characteristic definition data stored in the data memory corresponding to each data attribute stored on the data memory to each of the plurality of processing elements, imparting an operation instruction set based on the process control data to each of the plurality of processing elements in common, and outputting processed data from each of the plurality of processing elements.

In addition, each of the plurality of processing elements includes an input data register for storing data to be processed; character registers for to storing the characteristic definition data; an output data register for storing processed data acquired by processing; an attribute register for storing attribute data for the data to be processed; and a calculator configured to instruct characteristic definition data be selected and be stored in the character registers, the characteristic definition data being assigned to a attribute data stored in the character registers among characteristic definition data corresponding to given attribute data, and to process the data to be processed stored in the input data register according to an operation instruction set imparted by the processor based on the process control data and to characteristic definition data stored in the character registers.

Furthermore, the calculator operates, when the processor is sending out characteristic definition data corresponding to attribute data stored in the attribute register from the data memory, to load the characteristic definition data into the character registers, and to perform image data processing according to the operation instruction set using the characteristic definition data loaded in the character registers.

According to an alternate embodiment, a data processing apparatus is disclosed, including a data memory for storing characteristic definition data for defining characteristics of data processing for each attribute data;

a global register for storing a conversion program set;

a processor array comprising a plurality of processing elements, each of the plurality of processing elements including an input data register for storing data to be conversion processed, character registers for storing conversion characteristic definition data, an attribute register for storing attribute data for the data to be conversion processed, an output data register for storing processed data acquired by conversion processing, and a calculator configured to instruct a set of conversion characteristic definition data be selected, and subsequently be stored in the character registers, in which the conversion characteristic definition data are assigned to attribute data stored in the character registers among conversion characteristic definition data corresponding to attribute data stored in the character registers, and to perform conversion processing on the data to be conversion processed stored in the input data register according to a conversion operation instruction set based on the conversion control program and to conversion characteristic definition data stored in the character registers;

a global processor for assuming control of writing a data stream to be conversion processed into the input data register included in each of the plurality of processing elements, sending out the conversion characteristic definition data stored in the data memory corresponding to each attribute data to the character registers, imparting an operation instruction set based on the conversion process control program stored on the global register to each of the calculator in the plurality of processing elements in common, and outputting processed data from each of output registers; and a program memory for storing a process program set for the global processor to perform the control.

In another embodiment, an image data processing apparatus is disclosed, including a data memory for storing conversion characteristic definition data for defining gamma conversion characteristics of image data for each attribute of the image data;

a global register for storing attribute detection control program for controlling a generation of attribute data describing image characteristics revealed by the image data, and conversion control program for controlling gamma conversion on the image data;

a processor array comprising a plurality of processing elements, each of the plurality of processing elements including an input data register for storing image data to be conversion processed, character registers for storing conversion characteristic definition data, an attribute register for storing attribute data of the image data to be conversion processed, an output data register for storing processed data acquired by conversion processing, and a calculator configured to generate, and to subsequently store in the attribute register, attribute data of image data stored in the input data register according to an operation instruction set to the calculator based on attribute detection control data stored in the global register, image data stored in the input data register, and image data assigned to picture elements in a vicinity of a noteworthy image data, to select, and to subsequently store in the attribute register, conversion characteristic definition data assigned to attribute data stored in the character registers among conversion characteristic definition data corresponding to attribute data stored in the data memory, and to perform gamma conversion processing on the data to be conversion processed stored in the input data register according to a conversion operation instruction set based on the conversion control program stored in the global register and conversion characteristic definition data stored in the character registers;

a global processor for assuming control of
writing an image data stream into the input data register included in each of the plurality of processing elements, imparting an operation instruction set based on an attribute detection control program set stored on the global register to each calculator in the plurality of processing elements in common, sending out the conversion characteristic definition data corresponding to each attribute data stored on the data memory to the character registers, imparting a further operation instruction set based on conversion control program stored on the global register to the each calculator in the plurality of processing elements in common, and outputting conversion processed data from the output data register; and a program memory for storing a global control program set for,the global processor to perform the control.

In yet another embodiment, an image processing apparatus is disclosed, including an imaging means for generating pictorial image data representing a pictorial image; and an image data processing apparatus, for performing picture gamma conversion of the pictorial image data for correcting image distortion caused during imaging, as anyone selected from those detailed in the following description in the present disclosure.

In another embodiment, an image forming apparatus is disclosed, including an imaging means for generating pictorial image data representing a pictorial image; and an image data processing apparatus, for performing data conversion of the pictorial image data for forming images for use in record outputting to form images on a sheet by means of a printer, as anyone selected from those detailed in the following description in the present disclosure.

The present disclosure and features and advantages thereof will be more readily apparent from the following detailed description and appended claims when taken with drawings.

BRIEF DESCRIPTION OF THE DRAWINGS

In the following drawings, like references numerals will be used to refer to like elements in the various drawings, in which:

FIG. 9A, 9B, 9C is a diagrammatic block diagram illustrating the internal structure of a portion of the processor array 144;

FIG. 10A, 10B includes a flow chart generally illustrating gamma-conversion processing control by the global processor 148 of FIGS. 8 and 9;

FIG. 15B includes a table illustrating conversion characteristic definition data sets $\{(x_i, y_i), a_i\}$ in use for gamma-conversion processing disclosed herein;

FIG. 15C illustrate an expression for computing output densities in the case when input density is to be quantized into 256 gradation;

FIG. 15D includes a table illustrating weighing factors used in the convolution calculation in gamma-conversion processing disclosed herein.

DESCRIPTION OF THE PREFERRED EMBODIMENTS

Figure 1:
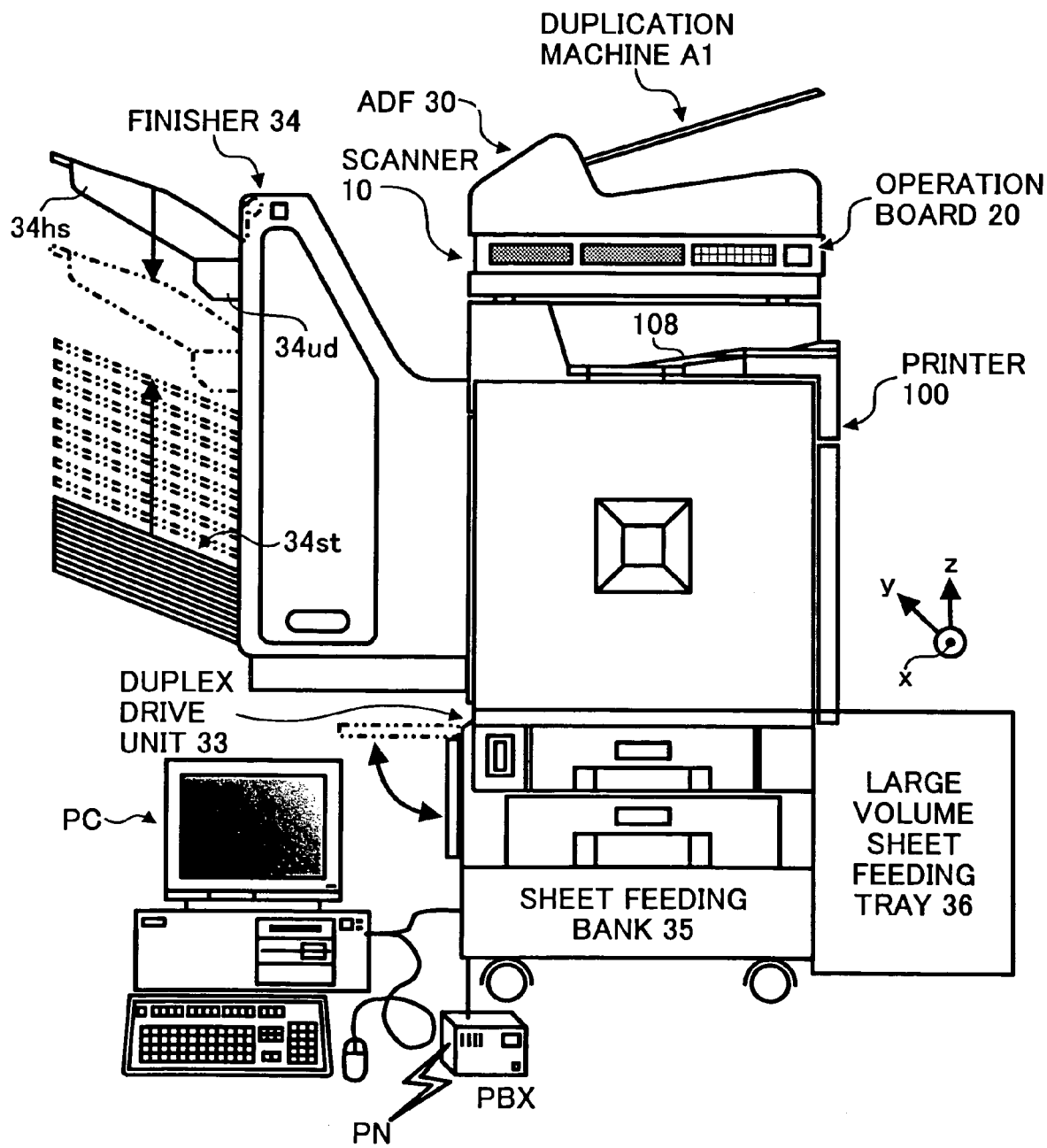
FIG. 1 is a schematic side view of a full color digital duplication machine Al according to one embodiment disclosed herein.

In the detailed description which follows, specific embodiments of a data processing apparatus and several systems incorporating the processing apparatus. It is understood, however, that the present disclosure is not limited to these embodiments. For example, it is appreciated that the data processing apparatus disclosed herein may also be adaptable to any form of data conversion processing. Other embodiments will be apparent to those skilled in the art upon reading the following description.

In the present disclosure, a data processing apparatus is provided, including a data memory 146 for storing characteristic definition data defined for each data attribute; a plurality of processing elements PE each for selecting a set of characteristic definition data from the characteristic definition data stored in the data memory 146 corresponding to each data and each data attribute out of a data stream to be processed, and perform a processing of each data according to the group of characteristic definition data; and a process control means 148 for storing process control data for controlling processing of each data, imparting an operation instruction set based on the process control data to each of the plurality of processing elements PE in common, imparting each of the data stream to each of the plurality of processing elements, sending out the characteristic definition data stored in the data memory 146 corresponding to each attribute data stored on the data memory to each of the plurality of processing elements, and outputting processed data from each of the plurality of processing elements.

It may be noted in this context that reference numerals and abbreviated notations, which are detailed in the following description representing various parts and units disclosed, are herein included beforehand for facilitating the forthcoming discussion.

In the present embodiment, therefore, by performing such control as imparting an operation instruction set based on the process control data to each of the plurality of processing elements PE in common, image data processing becomes feasible in the case of mixed attributes of the data.

In addition, the setting of conversion characteristics corresponding to such attributes can be carried out with more ease by the process control means 148 and processing elements PE.

Furthermore, since it is sufficient to prepare in data memory 146 the conversion characteristic definition data corresponding to respective attribute data, the amount of data and the size of memory required for the conversion are considerably reduced in comparison with those utilized with the LUTs (look up tables).

The noted process control means 148 in the data processing apparatus includes a global register 149 for storing, and imparting the process control data for controlling processing of each data to each of the plurality of processing elements PE in common, and a processor 148 for assuming control of writing the process control data into the global register 149, imparting each of the data stream to each of the plurality of processing elements PE, sending out the characteristic definition data stored in the data memory 146 corresponding to each data attribute stored on the data memory 146 to each of the plurality of processing elements PE, imparting an operation instruction set based on the process control data to each of the plurality of processing elements PE in common, and outputting processed data from each of the plurality of processing elements.

A program memory 145 is further included to store a process program set for the processor 148 to perform the above noted control.

Each of the plurality of processing elements PE includes an input data register for storing data to be processed; character registers for to storing the characteristic definition data; an output data register for storing processed data acquired by processing; an attribute register for storing attribute data for the data to be processed; and a calculator configured to instruct characteristic definition data be selected and be stored in the character registers, the characteristic definition data being assigned to a attribute data stored in the character registers among characteristic definition data corresponding to given attribute data, and to process the data to be processed stored in the input data register according to an operation instruction set imparted by the processor based on the process control data and to characteristic definition data stored in the character registers.

The processor operates to assume control of writing a data stream to be processed into the input data register included in each of the plurality of processing elements PE, sending out the characteristic definition data stored in the data memory corresponding to each attribute data to the character registers, writing the process control data into the global register, and outputting processed data from the output data register.

In addition, when the processor 148 is sending out characteristic definition data corresponding to attribute data stored in the attribute registers R4 from the data memory 146, to load the characteristic definition data into the character registers R1~R3, the calculators 151~155 is configured, when the processor is sending out characteristic definition data corresponding to attribute data stored in the attribute register from the data memory, to load the characteristic definition data into the character registers, and to perform image data processing according to the operation instruction set using the characteristic definition data loaded in the character registers. As a result, the data x to be converted in the input data register R0 are converted to conversion processed data y.

By performing such control by the processor 148 as sending out sequentially characteristic definition data corresponding to the each attribute data from the data memory 146 to the register R1~R3 based on the data written into the input data register, image data processing becomes feasible in the case of mixed attributes of the data. In addition, the setting of conversion characteristics corresponding to such attributes can be carried out with more ease by the process control means 148 and processing elements PE.

Furthermore, since it is sufficient to prepare in data memory 146, the conversion characteristic definition data corresponding to respective attribute data, the amount of data and the size of memory required for the conversion are considerably reduced in comparison with those utilized with the LUTs.

The processor 148 operates to control sending out sequentially characteristic definition data corresponding to each attribute data from the data memory to the character registers based on the data written into the input data register R0, impart an operation instruction set to the calculator 151~155 based on process control data, and output conversion processed data written into the output register by the calculator; and the calculator operates, when the processor is sending out characteristic definition data corresponding to attribute data stored in the attribute register from the data memory, to load the characteristic definition data into the character registers, and to perform image data processing according to the operation instruction set using the characteristic definition data loaded in the character registers.

In the image data processing apparatus IPP disclosed herein, the characteristic definition data corresponding to attribute data include input data $x_i$, processed data $y_i$, obtained by processing the input data, and process parameter $a_i$.

In addition, the processor included in IPP operates, in sending out characteristic definition data corresponding to each attribute data, to assume control of sending out segmented position input image data assigned to the attribute data, processed data obtained by processing the segmented position input image data, and process parameters, sequentially in the order of the divided segment to the character registers from the data memory.

Furthermore, the calculator included in IPP operates, when the processor is sending out from the data memory 146, to load the segmented position input image data $x_i$ assigned to a segment corresponding to the data written into the input data register among the characteristic definition data x corresponding to attribute data stored in the attribute register, processed data $y_i$ obtained by processing the segmented position input image data, and process parameter $a_i$ into the character registers; and perform data processing, $y=\text{int}\{a_i(x-x_i)+y_i\}$, according to the operation instruction set on the data written into the input data register.

The present method is based on the polygonal line approximation for the non-linear relationship that is exemplified by input versus output data expression of the present image data characteristics. Therefore, as the number of segments increases, the accuracy of the approximation increases.

Thus, when the number of segments increases, the number of the data combination for $x_i$, $y_i$ and $a_i$ is also increases. However, the number of image processing characteristic definition data, which will be detailed herein below, is 3 ($x_i$, $y_i$, $a_i$).

For example, since 256 bits are needed briefly in one LUT for eight-bit data for conversion, the required amount of data and the size of memory decreases by bringing the segment number to be less than 256/3, or approximately 85. It may be added that the degree of the decrease is enhanced with the increase in the segment number.

The noted global register in the data processing apparatus operates to store attribute detection control data used for controlling data processing for generating attribute data of the image data by the plurality of processing elements, and impart an operation instruction set in common to the plurality of processing elements; and the calculator is configured to generate, and to subsequently store in the attribute register, attribute data of image data stored in the input data register according to the operation instruction set, image data stored in the input data register, and to image data assigned to picture elements in a vicinity of a noteworthy image data.

In the present embodiment, therefore, attribute data for the data to be processed can be detected just prior to the image data processing to be stored in the character registers, and attribute detection can be carried out efficiently.

In another aspect of the present disclosure, an image data processing apparatus IPP is provided, being including a data memory 146 for storing conversion characteristic definition data for defining gamma conversion characteristics of image data for each attribute of the image data;

a processor array 144 including a plurality of processing elements PE, each of the plurality of processing elements including an input data register R0 for storing image data to be conversion processed, character registers R1~R3 for storing gamma conversion characteristic definition data read out from the data memory 146, an attribute register R4 for storing attribute data describing image characteristics revealed by the image data, an output data register R5 for storing processed data y acquired by conversion processing, and a calculator configured to generate, and to subsequently store in the attribute register, attribute data of image data stored in the input data register according to image data stored in the input data register R0, and to image data assigned to picture elements in a vicinity of a present noteworthy image data, and to perform conversion processing on the data to be conversion processed stored in the input data register R0 according to gamma conversion characteristic definition data stored in the character registers;

a global register 149 for storing attribute detection control data for controlling a generation of the attribute data in the calculators 151~155 and conversion control data for controlling the gamma conversion in the calculators 151~155;

a processor 148 for assuming control of writing image data on one single raster into the input data register R0 included in each of the plurality of processing elements, writing the attribute detection control data and the conversion control data into the global register 149, imparting an operation instruction set to the calculator based on the attribute detection control data, sending out the conversion characteristic definition data corresponding to each attribute data stored on the data memory to the character registers R1~R3, imparting an operation instruction set to the calculator based on the conversion control data, and outputting conversion processed data from the output data register R5; and a program memory 145 for storing a conversion program set for the processor to perform the control.

In the present embodiment, attribute data for the image data on one raster can be detected just prior to the gamma conversion. As a result, the image data processing prior to the gamma conversion can be simplified.

The processor 148 in the present embodiment operates to control sending out sequentially characteristic definition data corresponding to each attribute data from the data memory 146 to the character registers R1~R3 based on the data x written into the input data register, impart an operation instruction set to the calculators 151~155 based on conversion control data, and output conversion processed data written into the output register R5 by the calculator; and the calculators 151~155 are configured, when the processor is sending out characteristic definition data corresponding to attribute data stored in the attribute register from the data memory 146, to load the conversion characteristic definition data into the character registers, and to perform conversion processing according to the operation instruction set using the conversion characteristic definition data loaded in the character registers.

In the present image data processing apparatus IPP, the characteristic definition data corresponding to attribute data include input data $x_i$, processed data $y_i$, obtained by processing the input data, and process parameter $a_i$.

In addition, the processor included in IPP operates, in sending out characteristic definition data corresponding to each attribute data, to assume control of sending out segmented position input image data assigned to the attribute data, processed data obtained by processing the segmented position input image data, and process parameters, sequentially in the order of the divided segment to the character registers from the data memory.

Furthermore, the calculator included in IPP operates, when the processor is sending out from the data memory 146, to load the segmented position input image data $x_i$ assigned to a segment corresponding to the data written into the input data register among the characteristic definition data x corresponding to attribute data stored in the attribute register, processed data $y_i$ obtained by processing the segmented position input image data, and process parameter $a_i$ into the character registers; and perform data processing, $y=\text{int}\{a_i(x-x_i)+y_i\}$, according to the operation instruction set on the data written into the input data register.

This method is based on the polygonal line approximation for the non-linear relationship that is exemplified by input versus output data expression of the present image data characteristics. Therefore, as the number of segments increases, the accuracy of the approximation increases.

Thus, when the number of segments increases, the number of the data combination for $x_i$, $y_i$ and $a_i$ is also increases. However, the number of image processing characteristic definition data is 3 ($x_i$, $y_i$, $a_i$).

For example, since 256 bits are needed briefly in one LUT for eight-bit data for conversion, the required amount of data and the size of memory decreases by bringing the segment number to be less than 256/3, or approximately 85. The effect of the decrease is enhanced with the increase in the segment number.

In still another aspect of the present disclosure, an image processing apparatus IPP is provided, including an imaging means 10 for generating pictorial image data representing a pictorial image; and an image data processing apparatus, for performing picture gamma conversion of the pictorial image data for correcting image distortion caused during imaging, as anyone selected from those described earlier in present disclosure.

As the examples of the imaging means, there cited are a document scanner and a digital camera. Following imaging process, image conversion is carried out to be suitably adapted to the data format for presentation on a display or printout by a printer 100, for example.

In either case, proper data conversion characteristics suitably selected for the image data conversion apparatus IPP are adopted to reproduce original images according to imaging characteristics for the display device or the printer.

The noted image processing apparatus additionally includes a parallel bus Pb for transferring the pictorial image data; a pictorial image memory MEM; a pictorial image memory control means IMAC for writing the pictorial image data on the parallel bus to be stored in the pictorial image memory, and reading out the pictorial image data stored in the pictorial image memory to be sent to the parallel bus; and a pictorial image data control means CDIC for controlling an exchange of the pictorial image data among the imaging means 10, the image data processing apparatus IPP, and the parallel bus Pb.

For example, RGB image data as the output from the imaging means 10 is fed to the image processing apparatus IPP by the pictorial image data control means CDIC, the data resultant from CDIC is sent to Pb, the image data on the Pb can be written into the pictorial image memory MEM by the pictorial image memory control means IMAC.

The pictorial image data control means CDIC operates to assume control of one of performing inelastic compression on the pictorial image data formed by the imaging means 10 to be output subsequently to the parallel bus Pb, transforming the pictorial image data to the image data processing apparatus IPP for processed pictorial image data to be performed with inelastic compression and subsequently output to the parallel bus PB, and decompressing the pictorial image data on the parallel bus Pb to be transferred subsequently to the image data processing apparatus IPP.

For example, output RGB image data from the imaging means 10 are subjected to the inelastic compression 1 suitable for bus transfer by the pictorial image data control means CDIC and subsequently sent to Pb, and further the image data on the Pb are subjected to the elastic compression 2 suitable for writing into the memory by the pictorial image memory control means IMAC, and can be written into the pictorial image memory MEM.

In addition, the RGB image data stored in the pictorial image memory MEM are subjected to the decompression 2 (decompression of the compression 1) by the pictorial image memory control means IMAC and subsequently readout onto Pb, and further the image data on the Pb are subjected to the decompression 1 by the pictorial image data control means CDIC to be output.

In another aspect of the present disclosure, an image forming apparatus is provided, including a printer 100 for forming a pictorial image represented by pictorial image data on a sheet; and an image data processing apparatus for performing printer gamma conversion 305 of the pictorial image data for forming image data for use in record outputting so as suitably adapted to image formation by means of the printer, as anyone selected from those described earlier in present disclosure.

The image forming apparatus additionally includes a parallel bus Pb for transferring the pictorial image data; a pictorial image memory MEM; a pictorial image memory control means IMAC for writing the pictorial image data on the parallel bus to be stored in the pictorial image memory, and reading out the pictorial image data stored in the pictorial image memory to be sent to the parallel bus; and an pictorial image data control means CDIC for controlling an exchange of the pictorial image data between the image data processing apparatus IPP and the parallel bus Pb.

For example, the image data stored in the pictorial image memory MEM are readout onto Pb by the pictorial image memory control means IMAC, and the image data on the Pb are forwarded to the image data processing apparatus IPP by the pictorial image data control means CDIC to be printout by the printer 100.

In another aspect of the present disclosure, an image forming apparatus is provided, including an imaging means 10 for generating pictorial image data representing a pictorial image; and an image data processing apparatus IPP, as anyone selected from those described earlier in present disclosure for performing data conversion (194,305) of the pictorial image data for forming images for use in record outputting to form images on a sheet by means of a printer 100.

As the examples of the imaging means, there cited are a document scanner and a digital camera. Following imaging process, image conversion is carried out to be suitably adapted to the data format for presentation on a display or printout by a printer 100, for example. Proper data conversion characteristics suitably selected for either the feature of a printer or the preference of a user.

The image forming apparatus additionally includes a parallel bus Pb for transferring the pictorial image data; a pictorial image memory MEM; a pictorial image memory control means IMAC for writing the pictorial image data on the parallel bus to be stored in the pictorial image memory, and reading out the pictorial image data stored in the pictorial image memory to be sent to the parallel bus; and an pictorial image data control means CDIC for controlling an exchange of the pictorial image data among the image data processing apparatus IPP, the imaging means 10 and the parallel bus Pb.

For example, the output RGB image data from the imaging means 10 are forwarded to image data processing apparatus IPP by the pictorial image data control means CDIC and can be printed out as out YMCK image data.

In addition, the output RGB image data from the imaging means 10 are converted by image data processing apparatus IPP and sent out to Pb and can be written into the pictorial image memory MEM of the Pb by the pictorial image memory control means IMAC.

Furthermore, the RGB image data stored in the pictorial image memory MEM are read out onto Pb by the pictorial image memory control means IMAC, the RGB image data on Pb are forwarded to the image data processing apparatus IPP, and the resultant RGB image data are transferred to the image data processing apparatus IPP to subsequently be forwarded to the printer 100 to be printed out.

The pictorial image data control means included in the image forming apparatus operates to either compress the pictorial image data to be subsequently written into the image memory, or read out the pictorial image data from the image memory to subsequently be decompressed, in which the pictorial image data are those transferred between external units such as a personal computer, LAN, a facsimile connected to the parallel bus, and the pictorial image data control means.

By storing the image data once in the image memory MEM in the image forming apparatus disclosed herein, advanced measures such as processing, improving, and editing the image data can be achieved.

In addition, data exchange can be carried out by the pictorial image memory control means IMAC among external units such as a personal computer, LAN, a facsimile connected to the parallel bus, and said pictorial image data control means. Furthermore, high speed exchange and printout of the image data become feasible by the image data processing apparatus IPP.

Having described the present disclosure in general, the following examples are provided further to illustrate preferred embodiments of the invention.

EXAMPLE 1

FIG. 1 is a schematic side view of a full color digital duplication machine A1 provided with multiplex capabilities disclosed herein.

This full color digital duplication machine A1 generally includes several units such as an automatic document feeder (ADF) 30, an operation board 20, a color scanner 10, a color printer 100, and a paper sheet feeding bank 35.

Additionally equipped for the color printer 100 are a finisher 34 provided with a stapler and a tray capable of loading image formed sheets, a duplex drive unit 33, and a large volume sheet feeding tray 36.

To image data processing system ACP (FIG. 3) built in the digital duplication machine A1, LAN (Local Area Network) is connected, which is in turn connected with a personal computer PC.

In addition, there connected to a facsimile control unit FCU (FIG. 3) is a private branch exchange PBX which is further connected to the public telephone network PN (facsimile communication network).

The image formed sheets through the color printer 100 are disposed onto a sheet disposal tray 108 or finisher 34.

Figure 2:
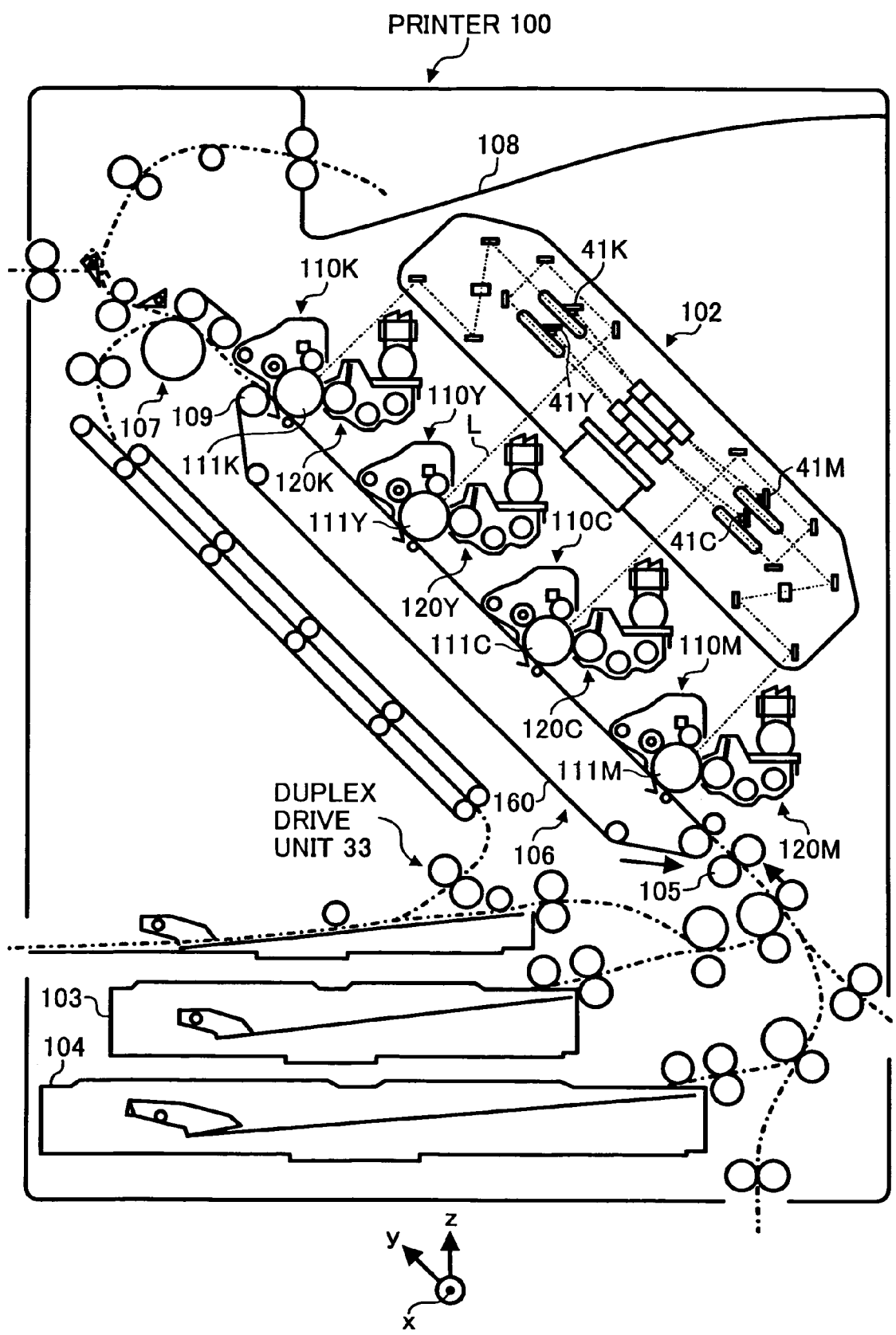
FIG. 2 is a diagrammatic schematic side view illustrating the construction of the color printer 100.

FIG. 2 is a diagrammatic schematic side view illustrating the construction of the color printer 100. The color printer 100 utilized in the present embodiment is a laser printer.

This laser printer 100 is provided with four sets of toner image forming units for forming images in four colors, magenta (M), cyan (C), yellow (Y), and black (K), arranged in that order along the traveling direction of the copy sheet (from lower right-hand corner to upper left in FIG. 2). That is, the laser printer 100 is a color printer of quadruple tandem type.

The magenta (M), cyan (C), yellow (Y), and black (K) toner image forming units are each provided with photoreceptor units 110M, 110C, 110Y, and 110K, including photoreceptor drums 111M, 111C, 111Y, and 111K, and developing units 120M, 120C, 120Y, and 120K, respectively.

In addition, these toner image forming units are arranged such that the axes of rotation of the photoreceptor drums 111M, 111C, 111Y, and 111K, are each in parallel to the horizontal x-axis (main scanning direction) and that the photoreceptor drums are situated having a predetermined pitch in the direction y of traveling copy sheet (vertical scanning direction).

In addition to the toner image forming units, the laser printer 100 is further provided with a laser exposure unit 102 utilizing laser beam scanning, sheet feeding cassettes 103 and 104, a registration roller pair 105, a transfer belt unit 106 including a transfer conveyor belt 160 for holding, and transporting transfer sheets so as to pass through image transferring points for respective toner image forming units, a fixing unit 107 of the belt fixing type, a sheet disposal tray 108, a duplex drive (sheet inverting) unit 33, etc.

Furthermore, the laser printer 100 is additionally provided (not shown) with a manual paper feed tray, a toner supplying bottle, a toner disposal bottle and so on.

The laser exposure unit 102 herein includes at least laser beam sources 41M, 41C, 41Y and 41K, a rotating polygonal mirror, a f-θ lens, and reflecting mirrors, etc. for the laser beams to be deflect in the x-direction and irradiated onto the surfaces of the photoreceptor drums 111M, 111C, 111Y, and 111K.

Referring to FIG. 2, the path for transporting copy sheets is shown with a dot-dashed line, in which a copy sheet fed from the sheet feeding cassettes, 103 and 104, is transported by conveyor roller to the registration roller pair 105 under guidance of conveyor guide (not shown).

Subsequently, the copy sheet is fed forward to the transfer conveyor belt 160 in the predetermined timing acted by the registration roller pair 105 so as to be held by the belt 160 and conveyed passing through image transferring points for respective toner image forming units.

The toner images formed on the photoreceptor drums, 111M, 111C, 111Y and 111K, in respective toner image forming units are transferred onto the copy sheet held by the belt 160 and conveyed passing through image transferring points, so that the copy sheet, on which the image overwritten in respective colors, or color image is formed, is forwarded to the fixing unit 107. That is, the image transfer performed herein is after the direct transfer method, in which the toner image is transferred directly onto the copy sheet upon passing through the fixing unit.

After fixing the toner image, the copy sheet is disposed to sheet disposal tray 108, or forwarded to finisher 36 or duplex drive unit 33.

By way of example, the yellow (Y) toner forming unit will be outlined herein below. Other toner forming units have the construction structure similar to the yellow (Y) toner forming unit.

As described earlier, the yellow (Y) toner image forming unit is provided with a photoreceptor unit 110Y and developing unit 120Y.

In addition to the photoreceptor drum 111Y, the photoreceptor unit 110Y is further provided with a brush roller for coating lubricating agent, and a blade reciprocatory provided for cleaning, a discharging lamp for irradiating, a charging roller of non-contact type for discharging, the surface of the photoreceptor drum, etc.

In the photoreceptor unit 110Y, the surface of the photoreceptor drum 111Y is first uniformly charged by a charging roller which is applied with AC voltage.

Thereafter, by means of the laser exposure unit 102, upon irradiating laser beams L, which are modulated corresponding to the image data to be printed and deflected by the polygonal mirror, electrostatic latent images are formed on thus charged surface of the photoreceptor drum 111Y. The latent electrostatic images formed on the photoreceptor drum 111Y are then developed by the developing unit 120Y, so as to be rendered visible as yellow Y toner images.

After the toner images are transferred, the surface of the photoreceptor drum 111Y is coated with a predetermined amount of lubricating agent using the brush roller, cleaned by the blade, discharged by irradiating light beams emanated from the discharging lamp, and prepared for formation of electrostatic latent images.

Also in the developing unit 120Y, a two-component developing agent is stored consisting of magnetizable developer mix including magnetic carrier granules and negative charging toner colorant particles.

In addition, the developing unit 120Y is further provided with a developing roller, transporting screw, doctor blade, toner concentration sensor, powder pump and so on, which are each positioned to be partially exposed when viewed from an opening on the photoreceptor drum 111Y of developing case 120Y.

The developing agent stored in the developing case is triboelectrically charged by being transported while stirring with the transporting screw. A portion of the developing agent is then held on the face of the developing roller.

Subsequently, the doctor blade functions to control the thus held developing agent to have a uniform layer thickness, toner particles included in the developing agent on the face of the developing roller are transferred to the photoreceptor drum, and toner images in reference to the electrostatic latent images show up on the photoreceptor drum 111Y.

The toner concentration in the developing agent in developing case 120Y is detected by a toner concentration sensor. If an insufficient concentration thereof is found, toner particles are replenished.

The transfer conveyor belt 160 of transfer belt unit 106 is suspended being wound around four grounded suspension rollers so as to pass through respective transfer points which are each positioned in contact with opposing photoreceptor drums 111M, 111C, 111Y, and 111K of respective toner image forming units.

The roller 109 is shown in the drawing as one of the suspension rollers. Among the suspension rollers, an electrostatically adsorbing roller is provided being biased at a predetermined voltage opposing to the inlet roller which is positioned upstream of the traveling direction of paper sheet designated by the double dots-dashed curve in FIG. 2.

The copy sheet passing through between these two rollers is electrostatically adsorbed onto the transfer conveyor belt 160. In addition, the exit roller, which is positioned downstream of the traveling direction of the paper sheet, is utilized for frictionally driving the transfer conveyor belt 160 and connected to a driving power source (not shown).

Further, a bias roller is provided being biased at a predetermined voltage by a source on the outer periphery of the transfer conveyor belt 160 so as to be brought into contact therewith. By the bias roller, foreign materials adhered onto the transfer conveyor belt 160 are removed.

Transfer bias application members are provided to be in contact with the rear face of transfer conveyor belt 160, which forms contact opposing portions that are each positioned in contact with respective opposing photoreceptor drums 111M, 111C, 111Y, and 111K. These transfer bias application members are each fixed brushes made of Mylar and applied by transfer bias from voltage source.

Transfer electrical charges are then brought about by the transfer bias and image transfer electric field is generated in a predetermined intensity between transfer conveyor belt 160 and the surface of the photoreceptor drums.

The copy sheets, which are transported by the belt 160 and transferred with toner images in respective colors formed on the photoreceptor drums 111M, 111C, 111Y, and 111K, are forwarded to the fixing unit 107 where the toner images on the sheet are permanently fixed under suitable heating under pressure.

Following the fixing, the copy sheets are advanced to finisher 34 or disposed to a sheet disposal tray 108 equipped on the top face of the printer chassis.

The photoreceptor drums 111M, 111C, and 111Y among the four drums for forming the images in magenta, cyan and yellow, are driven by one electromotor (or color drum M, not shown) with single reduction through drive train system and reduction gears (not shown).

The photoreceptor drum 111K for forming the images in black is driven by another electromotor (K drum motor, not shown) also with single reduction through drive train system and reduction gears (not shown). In addition, the transfer conveyor belt 160 is transported around by the K drum motor driving through drive train system.

The K drum motor is therefore designed to drive the K photoreceptor drum 111K and transfer conveyor belt 160, while the color drum motor is to drive the M, C, Y photoreceptor drums 111M, 111C, and 111Y.

In addition, the K developing unit 120K is driven by the same motor (not shown) for fixing unit 107 through drive train system and clutch (not shown).

The M, C, Y developing units 120M, 120C, and 120Y are driven by the same motor (not shown) for registration roller pair 105 through drive train system and clutch (not shown).

The developing units 120M, 120C, 120Y, and 120K are driven not always but intermittently at predetermined timing by properly engaging the clutch for receiving the driving power.

Referring again to FIG. 1, the finisher 34 is provided with a stacker tray including a load-descending tray 34*hs* and a group of sort trays 34*st*, and can be operated in several modes such as stacker sheet disposal mode for disposing paper sheets (printed or copied sheets) to the sort trays 34*st* and sorter sheet disposal mode for disposing to the group of sort trays 34*st*.

The paper sheets forwarded from the printer 100 to finisher 34 are transported toward the upper left-hand, go through the transport route of downward U-shaped, switched to a downward path, and disposed depending on the preset mode from an outlet opening to the load-descending tray 34*hs* in the stacker sheet disposal mode.

In the sorter sheet disposal mode, by contrast, the sheets are disposed to the sort tray assigned presently out of the above noted group of the trays depending on the sheet to be disposed.

When the sorter sheet disposal mode is selected, a sheet disposal controller in the finisher 34 instructs to broaden the spacing between the sort trays by properly elevating the group of sort trays 34*st*, which has been placed at lowermost sheltering position, to the serving position designated by the double dotted-dash curves of FIG. 1.

In the sorter sheet disposal mode and in the duplication or printing for the case where one time (or one person) operation is selected, when the sorter sheet disposal mode is set to the volume sort, the sheets printed from the same document page (or the same image) are placed in respective trays of the group of sort trays 34st. When the sorter sheet disposal mode is set to the page sort, in contrast, each tray is allocated to each page (or each image) and the sheets printed from the same page (or the same image) are placed in one sort tray.

Figure 3:
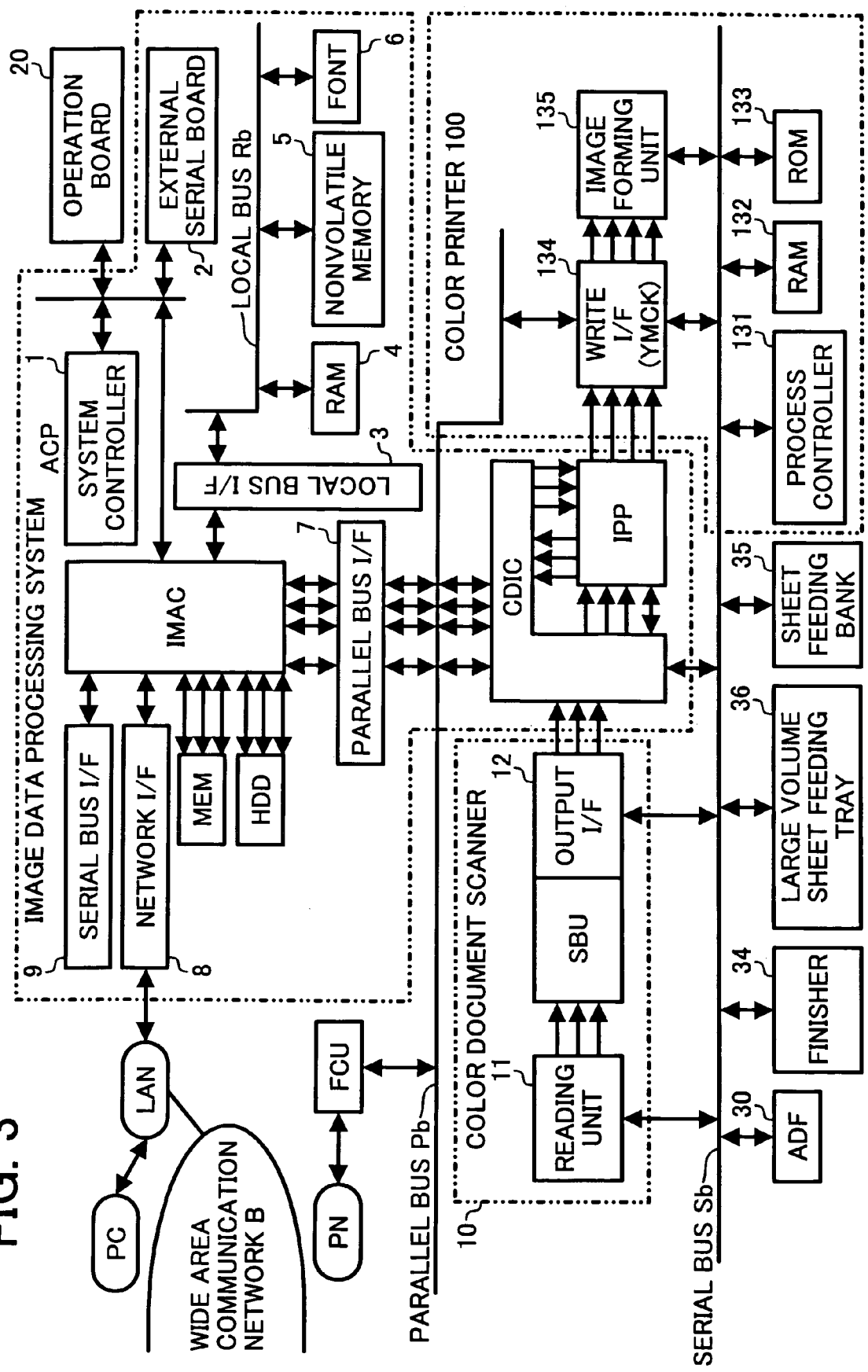
FIG. 3 is a diagrammatic block diagram illustrating the overall circuit construction of an image data processing system for the duplication machine of FIG. 1.

FIG. 3 is a diagrammatic block diagram illustrating the overall circuit construction of a pictorial image processing system for the duplication machine of FIG. 1.

Referring to FIG. 3, the pictorial image (or image) data processing system includes a color document scanner 12, which consists of read unit 11 and image data output I/F (interface), is connected to image data interface control CDIC (code/decode image control) of image data processing system. Also connected to the image data processing system is a color printer 100.

On receiving the record image data into write I/F 134 from image data processing unit IPP (Image Processing Processor) (referred to as IPP) of image data processing system, the color printer 100 prints out various data by imaging unit 135. The imaging unit 135 in the present disclosure is illustrated in FIG. 2.

The image data processing system includes at least a parallel bus Pb, an image memory access controller (which is herein after referred to as IMAC), a memory module (MEM) as image memory, a hard disk unit (HDD) as nonvolatile memory, a system controller 1, a RAM 4, a nonvolatile memory 5, a font ROM 6, CDIC, and IPP.

A facsimile control unit FCU (FCU) is connected to the parallel bus Pb. In addition, an operation board 20 is connected to system controller 1.

Being included in color document scanner 10, the read unit 11 for optically reading document originals operates to receive the light beams reflected from the document originals illuminated with a lamp, for example, photo-electrically transform these light beams by a CCD device situated on a sensor board unit SBU (SBU) to thereby obtain R, G, and B image signals, convert into RGB image data by AD converter, provide shading correction steps, and output the resulting signals to CDIC by way of output I/F 12.

CDIC operates for the image data to be transferred among document scanner 10 (output I/F 12), parallel bus Pb and IPP. In addition, it also operates to communicate between process controller 131 and system controller 1 which assumes the overall system control.

In addition, RAM 132 is utilized as a work area for the process controller 131, and ROM 133 is in use for memorizing operation programs and other similar programs for the process controller 131.

IMAC controls for the image and control data to be properly written into/read out from MEM and HHD. The system controller 1 assumes the control of various units connected to parallel bus Pb.

In addition, RAM 4 is utilized as a work area for the system controller 1, and nonvolatile memory 5 is in use for memorizing operation programs and other similar programs for the system controller 1.

The operation board 20 instructs various process steps to be carried out by image data processing system such as, for example, the kinds of the process (duplication, facsimile transmission, image reading or printing) and the number of pages for the processing. As a result, input steps of the image data control information can be achieved properly.

The image data obtained by reading by means of read unit 11 of scanner 10 are subsequently subjected to the shading correction 210 by SBU of the scanner 10, provided with several image processing steps for correcting read distortions such as scanner gamma-correction and filter correction by IPP, and then stored in MEM and HDD.

When image data are printed out, the noted image data stored in MEM and HDD are subjected prior to the printing to the color transformation by IPP from the RGB to YMCK signals, and provided with several picture image quality processing steps such as printer gamma-correction and gradation correction, and dither or error diffusion processing.

Following the picture image quality processing, resultant image data are sent to write I/F 134 from IPP. The write I/F 134 then carries out laser control steps by modulating pulse width and power of the laser with respect to the thus gradation processed image data. Subsequently, the image data are sent to image forming unit 135, so that reproduced images are formed on a transfer copy sheet.

Based on the control by the system controller 1, IMAC carries out various process steps such as access control to image data and to MEM or HDD, print data evolution in personal computers PC (PC) interconnected on LAN system, and compression/decompression of image data.

The image data sent to IMAC are stored in MEM or HDD following the data compression, the stored image data are readout where appropriate. The readout image data are extended to be regenerated as the original image data and subsequently sent back to CDIC by way of parallel bus Pb.

Following sending back to IPP from CDIC, the image data are subjected to picture image quality processing, input to write I/F 134, and formed as reproduced pictorial images on a transfer copy sheet by image forming unit 135.

The capabilities of digital multiplex machine become feasible in the present disclosure through image data processing by means of the parallel bus Pb and the bus control by CDIC.

The facsimile transmission is achieved by performing image processing on the readout image data by IPP and transmitting to FCU by way of CDIC and parallel bus Pb.

FCU carries out data conversion for the communication network on the image data, which are transmitted to the public network as facsimile data.

The facsimile reception is performed by converting the network data acquired from public network PN into image data by FCU, and transmitting the resulting data to IPP by way of parallel bus Pb and CDIC. Without providing special image processing onto the data in this case, the image data are output from I/F 134 and reproduced pictorial images are formed on a transfer copy sheet by image forming unit 135.

In the case when plural jobs are performed in parallel such as, for example, duplication, facsimile transmission or reception, and printout, the allocation of the jobs is controlled by system controller 1 and process controller 131.

The process controller 131 controls the flow of image data and the system controller 1 assumes the overall control of the system and the startups of resources for the system. In addition, the selection among the capabilities of the digital multiplex machine is performed by operation board 20, so that the contents of process are properly selected such as duplication, facsimile transmission or reception and others.

The system controller 1 and process controller 131 are configured to communicate each other by way of parallel bus Pb, CDIC and serial bus Sb.

To be more specific, by transmitting thorough CDIC the data between the parallel bus Pb and serial bus Sb, and by performing the data format conversion for the interfaces, the communication between system controller 1 and process controller 131 is achieved.

Various bus interfaces such as parallel bus I/F 7, serial bus I/F 9, local bus I/F 3 and internet bus I/F 8, are each connected to IMAC.

The controller unit 1 is connected to related units by way of the various buses so as to assure its independence of operation within the entire image data processing system.

The system controller 1 controls other functional units by way of parallel bus Pb and operates to transmit image data. In addition, the system controller 1 imparts an operation control instruction for IMAC to store image data in MEM or HDD. The operation control instruction is transmitted by way of IMAC, parallel bus I/F 7 and parallel bus Pb.

In response to the operation control instruction, the image data is transmitted to IMCA by way of parallel bus Pb and parallel bus I/F 7. The image data are subsequently stored in MEM or HDD under the control of IMAC.

In the case when the printer capability is instructed by PC, on the other hand, the system controller 1 in image data processing system functions as a controller for printer, network or, serial bus.

In the case of the connection via network B, IMAC receives by way of internet bus I/F 8 the data of printout demand or accumulate (store) demand via the network B. These demand data (foreign commands) via the network B are notified to system controller 1.

According to the instruction from the system controller 1 in response to the above notification, IMAC operates to either transmit or receive/accumulate the demand data accumulated via the network B.

In the case of the multipurpose serial connection, IMAC receives printout demand data by way of serial bus I/F 9. The multipurpose purpose serial bus I/F 9 is in compliance with various standards such as, for example, USB (Universal Serial Bus), 1284 or 1394 standard interface.

The printout demand from PC is expanded to image data by system controller 1, in which the expansion is carried out into an area in MEM. The font data necessary for the expansion is obtained by referring to the font ROM 6 by way of local bus I/F 3 and local bus Rb. The local bus Rb connects the controller 1 to nonvolatile memory 5 and RAM 4.

As the serial bus Sb, there also included is an interface in use for transmitting to the operation board 20 as the operation unit of ACP in addition to the external serial board 2 for PC connection. This interface not only transmits the print expansion data but also communicates with system controller 1 by way of IMAC so as to accept the job procedure and display system status.

The data transmission and reception between the system controller 1 and several units such as MEM, HDD and various buses is performed by way of IMAC. Various jobs utilizing MEM and HDD are managed in a consolidated manner within the entire image data processing system.

Figure 4:
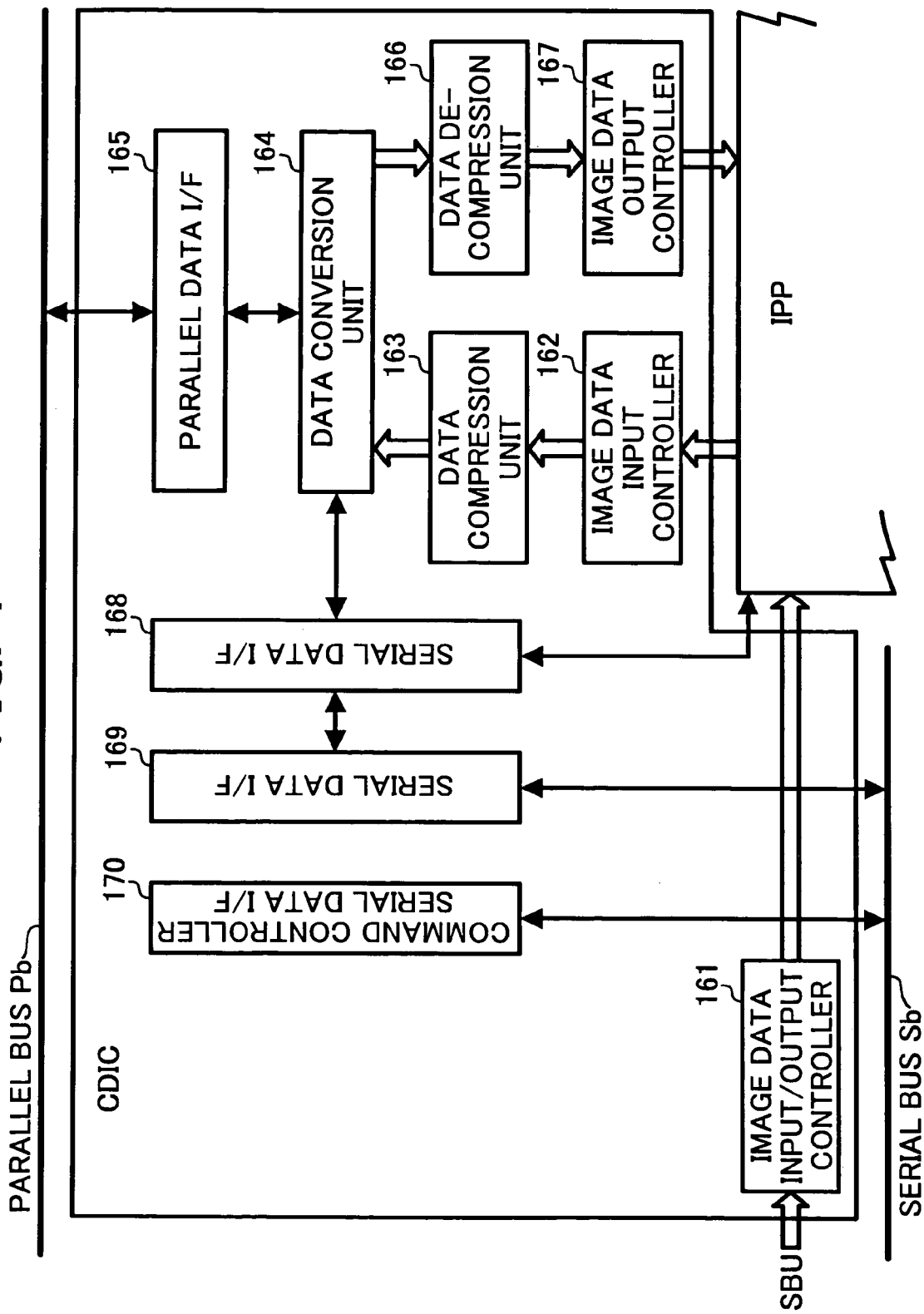
FIG. 4 is a diagrammatic block diagram illustrating the overall functional construction of the CDIC unit.

FIG. 4 is a diagrammatic block diagram illustrating the overall functional construction of the CDIC subsystem.

Referring to FIG. 4, image data input/output controller 161 receives image data output by color document scanner 10 (SUB) and subsequently to IPP. IPP is configured to perform "scanner image data processing" 190 (FIG. 6) on the received image data and transmits the resulting image data to image data input controller 162 included in CDIC.

The data received by the image data input controller 162 are subjected to primary image data compression by data compression unit 163. The thus compressed data are converted into parallel data by data conversion unit 164 and transmitted to parallel bus Pb via parallel data I/F 165. The image data input from the parallel bus Pb via parallel data I/F 165 are serially converted by the data conversion unit 164.

Since the thus input data are previously subjected to the primary conversion for the bus transfer, they are expanded by data expansion unit 166. The expanded image data are transferred to IPP by image data output controller 167. These data are then converted from RGB to YMCK image data by "picture image quality processing" 300 (FIG. 6) and further to YpMpCpKp as the image data for image output to be output to color printer 100.

CDIC is configured to have the conversion capability for both parallel data transferred by parallel bus Pb and serial data transferred by serial bus Sb.

The system controller 1 transfers data to parallel bus Pb, while the process controller 131 does to serial bus Sb. In order to achieve the communication with two controllers, 1 and 131, the parallel/serial data conversion is carried out by the data conversion unit 164 and serial data I/F 169. The serial data I/F 169 is in use for IPP, in which both serial data I/F 169 and the IPP both carry out the serial data transfer.

Figure 5:
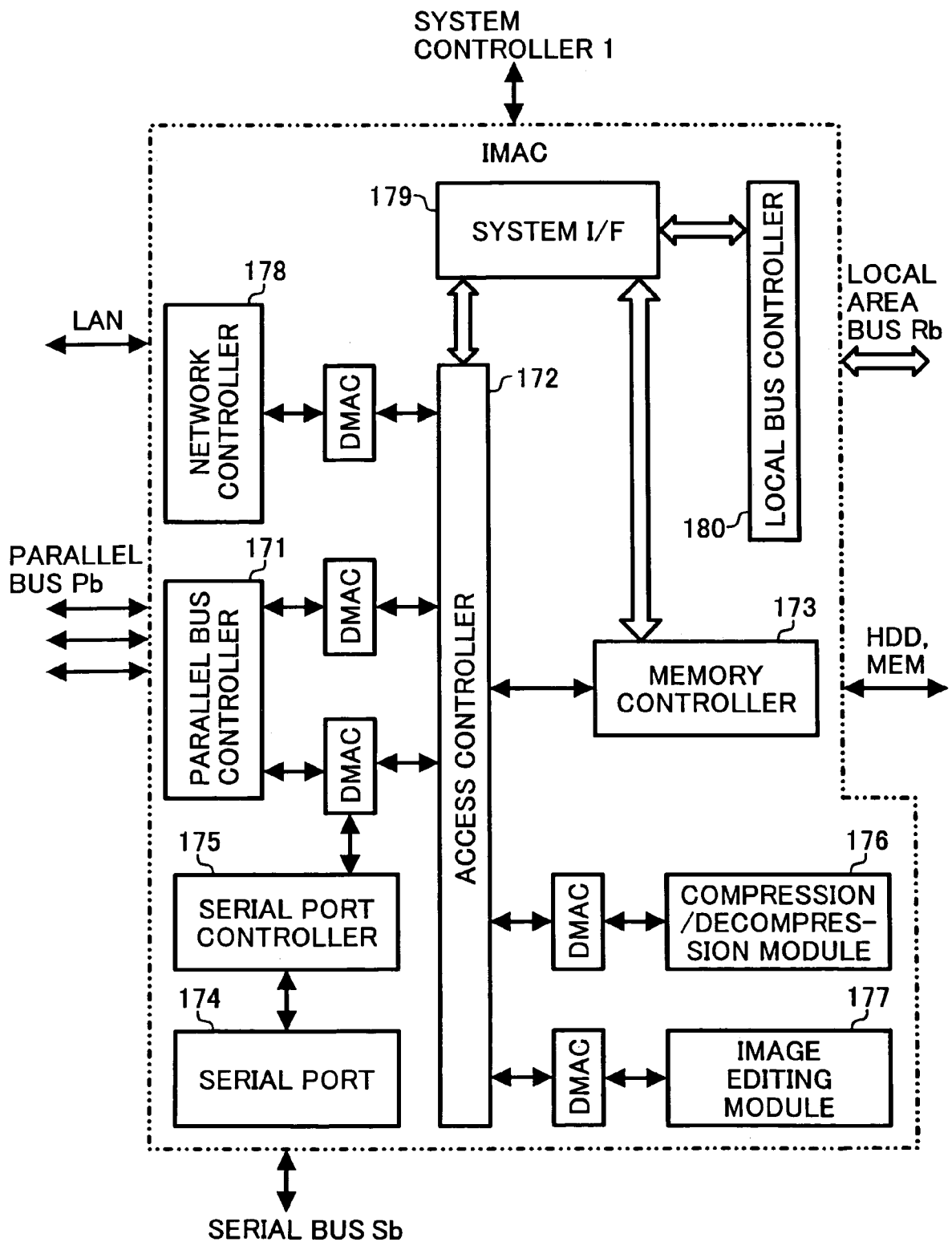
FIG. 5 is a diagrammatic block diagram illustrating the overall construction of the IMAC unit.

FIG. 5 is a diagrammatic block diagram illustrating the overall construction of the IMAC unit.

Referring to FIG. 5, the IMAC unit is provided with at least an access controller 172, memory controller 173, secondary compression/decompression module 176, image editing module 177, system I/F 179, local bus controller 180, parallel bus controller 171, serial port controller 175, and network controller 178.

The secondary compression/decompression module 176, image editing module 177, parallel bus controller 171, serial port controller 175, and network controller 178 are each connected to access controller 172 by way of DMAC (Direct Memory Access Controller).

The system I/F 179 carries out the transmission to, and reception from the system controller 1, of various commands and data. In principle, the system controller 1 assumes the overall control of image data processing system. In addition, it also controls resource allocation for MEM and HDD, while other units are controlled by way of system I/F 179, parallel bus controller 171, and parallel bus Pb.

Various units included in image data processing system, in principle, are each connected to parallel bus Pb. Therefore, the parallel bus controller 171 achieves the control the data transmission to, and reception from, the system controller 1, MEM and HDD, by controlling the bus allocation.

The network controller 178 controls the connection to LAN and data transmission and reception for external, expanded units connected to network.

Although the system controller 1 does not take part in controlling the operation of the units interconnected through the network, it does control the interfaces included in IMAC. In addition, the control for 100BASE-T is also included in the present disclosure although any specific description is made further herein.

The serial port 174 connected to serial bus includes a plurality of ports. The serial port controller 175 is provided with port controlling features appropriately corresponding to the kinds of buses installed presently.

Although any further description is made herein, the serial port 174 carries out the port control of USB and 184. Apart from the external serial ports, it also controls data transmission and reception between the control units with respect to command acceptance and system status display.

The local bus controller 180 interfaces with the local serial bus Rb which is interconnected with RAM 4 and nonvolatile memory 5 necessary for booting the system controller 1 and with font ROM 6 utilized for expanding print code data.

As to the operation control the IMAC unit, there carried out is the command control by system controller 1 through system I/F 179.

The data control is carried out primarily on MEM and HDD by controlling the access from the exterior.

Image data are transferred from CDIC to IMAC by way of parallel bus Pb. These image data are subsequently taken into IMAC via parallel bus controller 171.

The memory access for the thus prepared image data is removed from the control by the system controller 1. That is, this memory access is carried out by direct memory access controller (DMAC) independently of the system control.

The access controller 172 operates to regulate access demands imparted from plural units. In addition, the memory controller 173 controls access operations to MEM and HDD, and data read/write.

In the access to MEM and HDD from network, the data taken from the network into IMAC via the network controller 178 are transferred to MEM and HDD by the direct memory access controller. The access controller 172 operates to regulate the access to MEM and HDD demanded by plural jobs. The memory controller 173 carries out read/write operations with respect to MEM and HDD.

In the access to MEM and HDD from the serial bus, the data taken into IMAC by the serial port controller 175 via the serial port 174 are transferred to MEM and HDD by the direct memory access controller DMAC. The access controller 172 operates to regulate the access to MEM and HDD demanded by plural jobs. The memory controller 173 carries out read/write operations with respect to MEM and HDD.

The printout data from PCs connected through the network or serial bus are expanded into an area in MEM or HDD by referring to the font data on the local bus.

The interfaces with various external units are controlled by the system controller 1. The data transfer following the noted taking into IMAC is controlled by regulating the memory access by individual DMAC. Since each DMAC carries out data transfer independently one another, the access controller 172 assumes the control over job collision in regard to the access to MEM and HDD, and over job priority among the plural access demands.

In addition to the above noted access by the DMAC, also included herein is the access from the system controller 1 via system I/F 179 to perform the bit map expansion of the stored data.

The DMAC data with access permit to MEM and HDD, and the data from system I/F 179 are transferred by the access controller 172 directly to MEM and HDD by way of memory controller 173.

As indicated earlier, the IMAC unit is provided with secondary compression/decompression module 176 and image editing module 177 to process data within the subsystem. The secondary compression/decompression module 176 carries out the compression and decompression steps to facilitate the effective storing of image and code data into MEM and HDD. In addition, the module 176 also instructs DMAC to control the interfaces between MEM and HDD.

The image data once stored in MEM and HDD are called from MEM and HDD to the secondary compression/decompression module 176 by direct memory access controller DMAC. The image data subjected therein to data conversion are either put back to MEM and HDD, or output to the exterior by the direct memory access controller DMAC.

The image editing module 177 controls MEM and HDD by DMAC so that data processing is carried out within MEM and HDD. To be specific, the image editing module 177 carries out several processes such as rotating image and synthesizing plural different images besides clearing memory areas.

In addition, the image editing module 177 also operates to readout secondary compressed data from MEM and HDD, and to expand to form primary compressed data by means of the secondary compression/decompression module 176. The thus formed primary compressed data are expanded to image data within the image editing module 177 in reference to the same decoding logic as the data expansion 163 included in CDIC, and subsequently processed.

These processed image data are subjected to several processes such as primary compression in reference to the same coding logic for CDIC and subsequent secondary compression by secondary compression/decompression module 176, and the resulting data are written into MEM and HDD.

Figure 6:
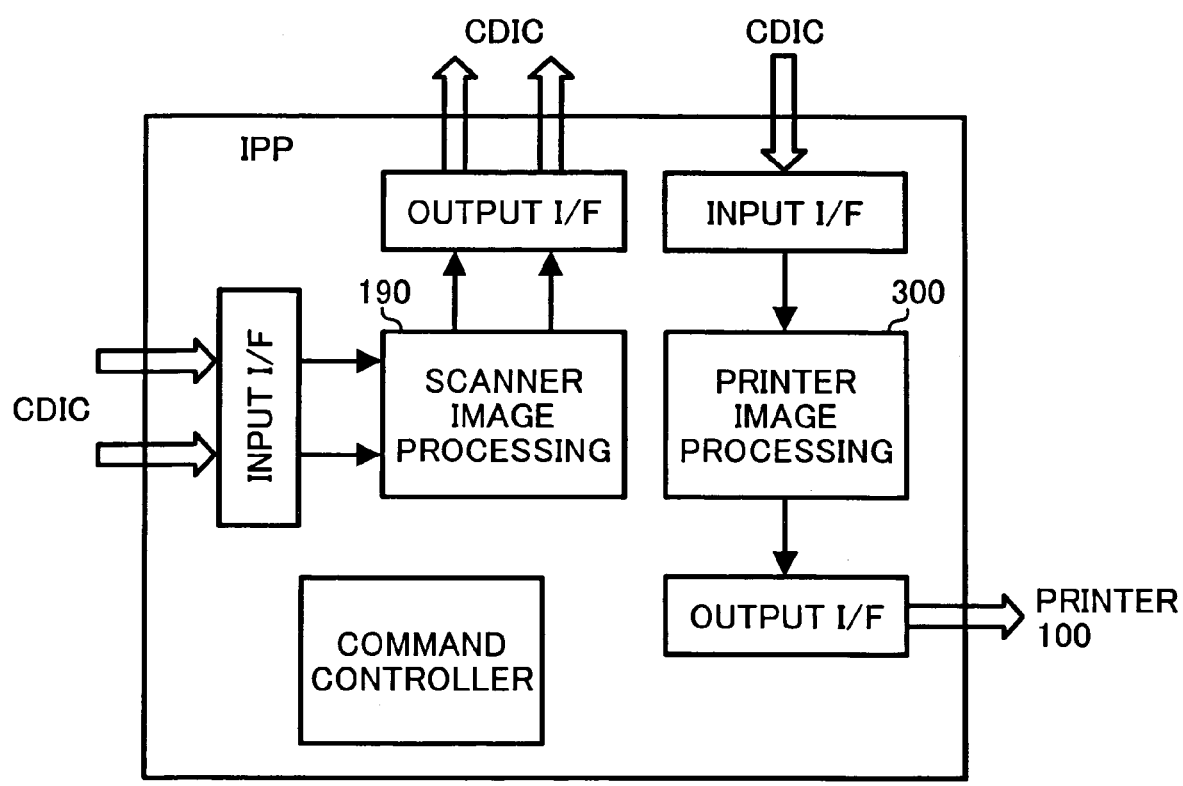
FIG. 6 is a block diagram illustrating in general the image data processing performed in the IPP unit.

FIG. 6 is a block diagram illustrating in general the image data processing performed in the IPP unit.

The image data presently readout are transferred from input I/F of IPP to "scanner image data processing" 190 by way of SBU and CDIC. By the "scanner image data processing" 190 herein intended is primarily to compensate the degradation in the readout image signals. Namely, the readout image signals are subjected to first the shading correction and then scanner gamma-correction, and the resulting data are transferred to CDIC and stored in MEM.

The image data, which are stored in MEM as above, are readout and transferred again to IPP by way of CDIC. There carried out then in IPP are "background blur removal processing" followed by "picture image quality processing" 300.

Figures 7, 7A:
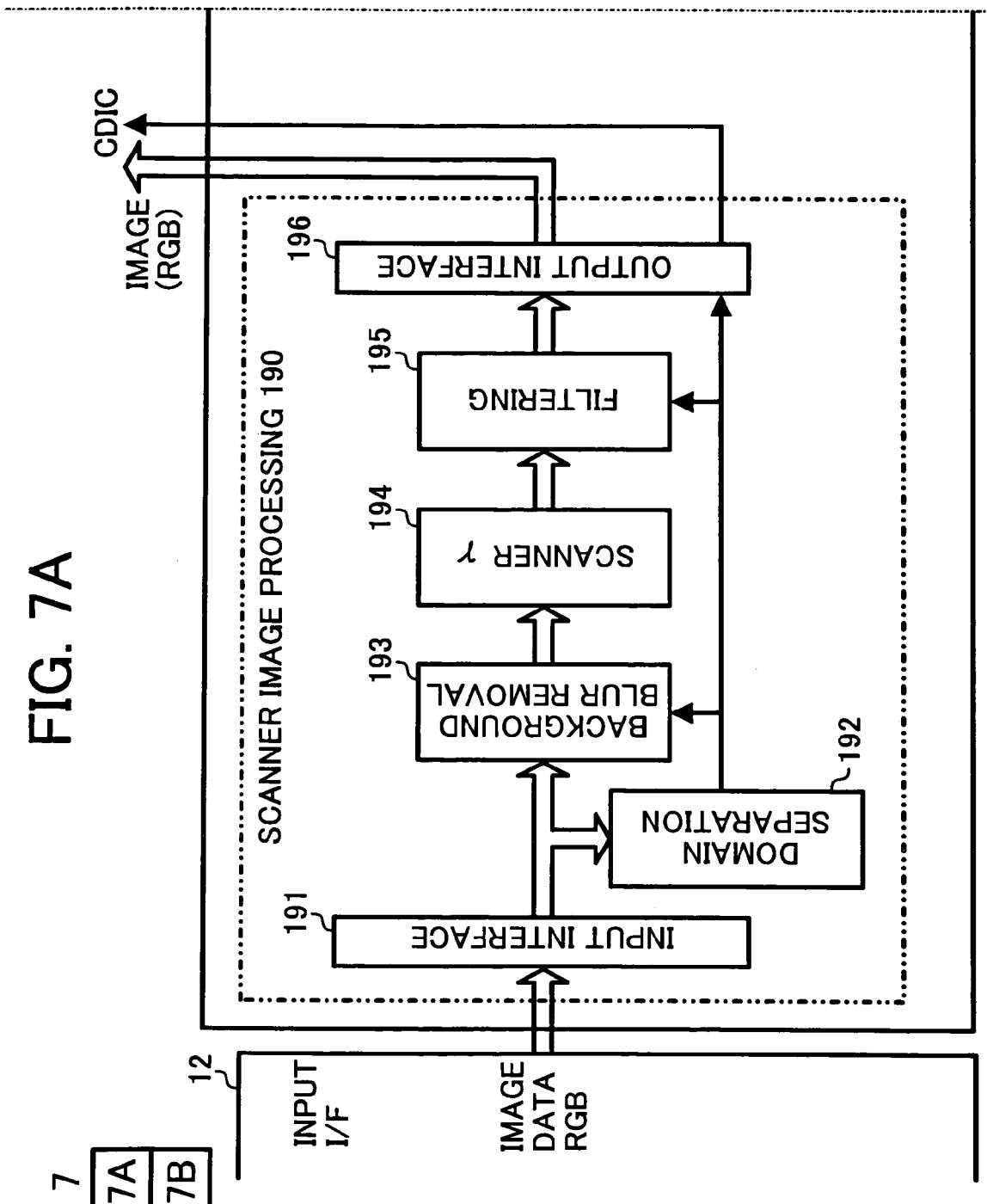
FIG. 7A, 7B is a block diagram illustrating the feature of the image data processing performed in the IPP unit of FIG. 6.
Figure 7B:
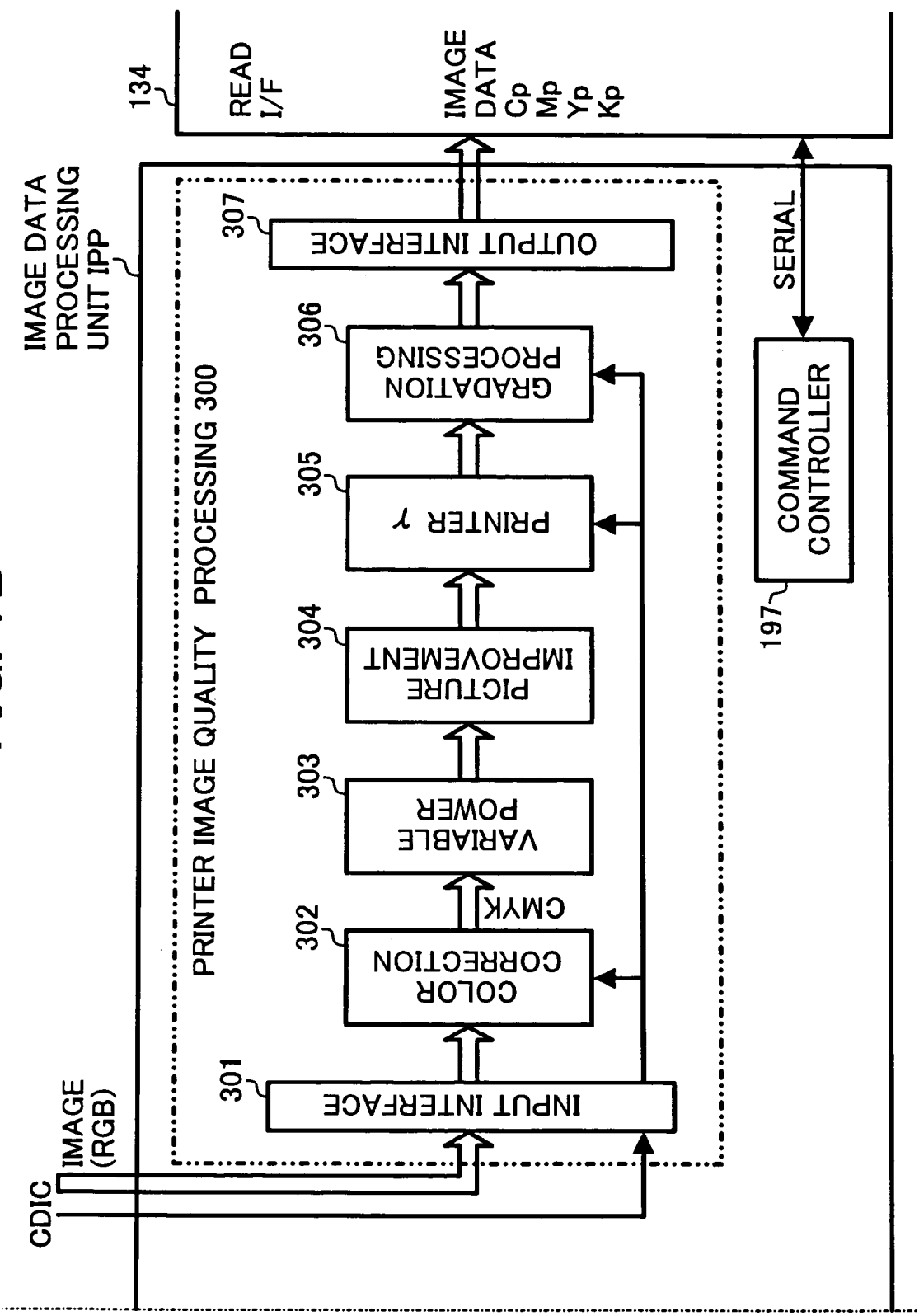

FIG. 7 is a block diagram illustrating the feature of the image data processing of FIG. 6.

The IPP subsystem carries out several processing such as domain separation (determine the images are in character or picture domain: picture domain separation) 192, background blur removal 193, scanner gamma-conversion 194, filtering 195, color correction 302, variable power 303, picture improvement 304, printer gamma-conversion 305, and gradation processing 606.

The IPP subsystem therefore serves as a programmable, computing and processing means for pictorial image processing.

The image data input from scanner 10 into CDIC via output I/F 12 are transferred to IPP by way of CDIC, subjected to correction for signal degradation caused by optical system and quantization of digital signals (signal degradation by the scanner system), and output (transmitted) again to CDIC.

The image data returned from CDIC to IPP are subjected to "picture image quality processing" 300 which is performed in IPP.

There carried out in the "picture image quality processing" 300 are several processing such as, for example, color correction 302 from the RGB to YMCK signals, variable power 303, picture improvement 304, printer gamma-conversion 305 and gradation processing 306 including gradation conversion, dither or error diffusion processing.

Figure 8:
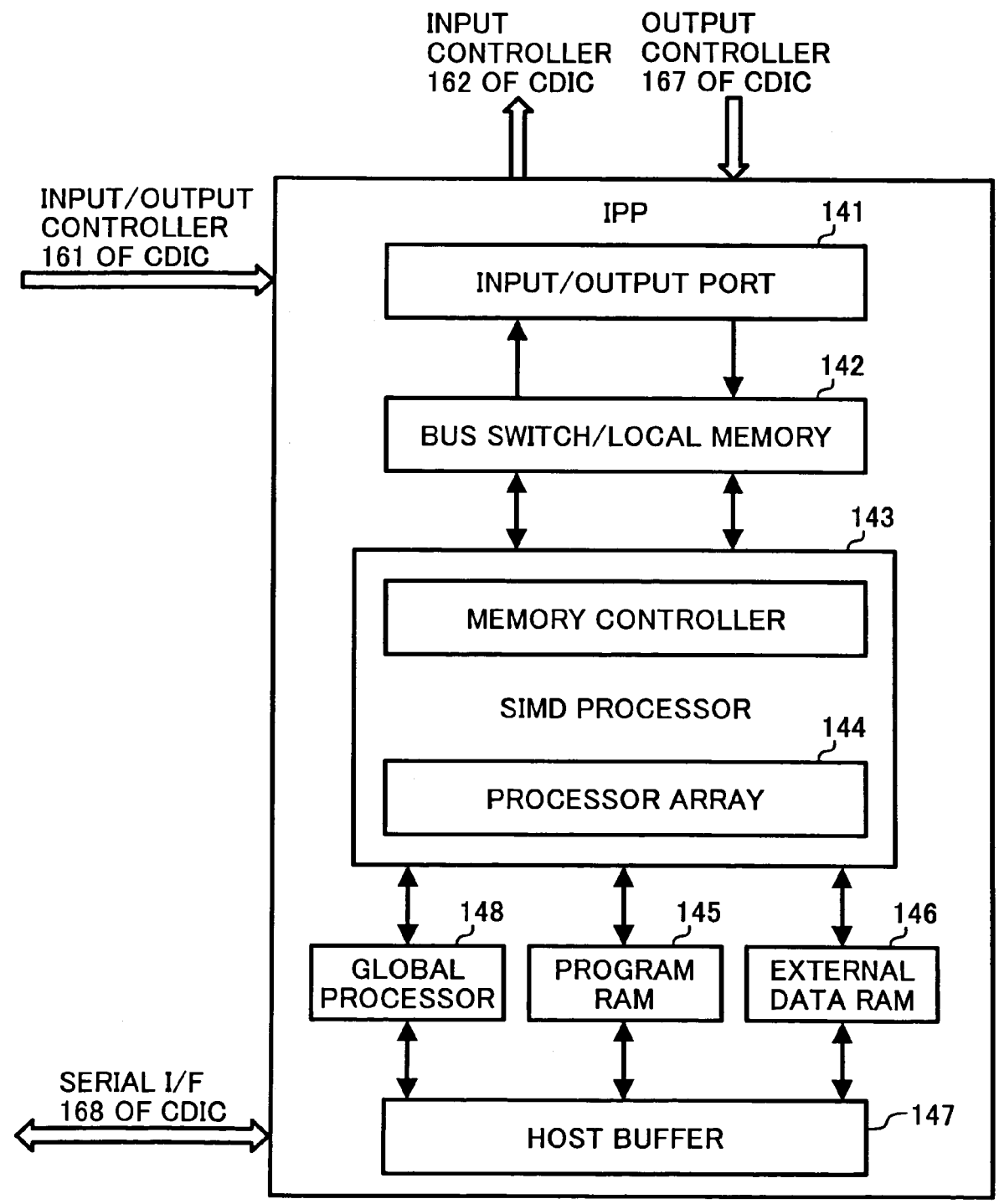
FIG. 8 is a block diagram illustrating the overall internal construction of the IPP unit.

FIG. 8 is a block diagram illustrating the overall internal construction of the IPP subsystem.

The IPP subsystem operates to carry out the acquisition of image data from output I/F of scanner SCR by way of CDIC and input from, and output to CDIC of image data via input/output port 141.

The input/output image data are stored once in a data buffer including bus-switch and buffer memory or an input/output register 142, and are subsequently either input into processor array 144 by way of SIMD type processor 143 or output to CDIC.

The data utilized for controlling IPP and image processing programs (programs and process parameters) of IPP are both present in HDD are forwarded to host buffer 147 by the transfer control by means of system controller 1, CDIC of process controller 131, and subsequently written into an external data RAM 146 (or data memory as referred to in earlier sections) and a programmable RAM.

Figure 9B:
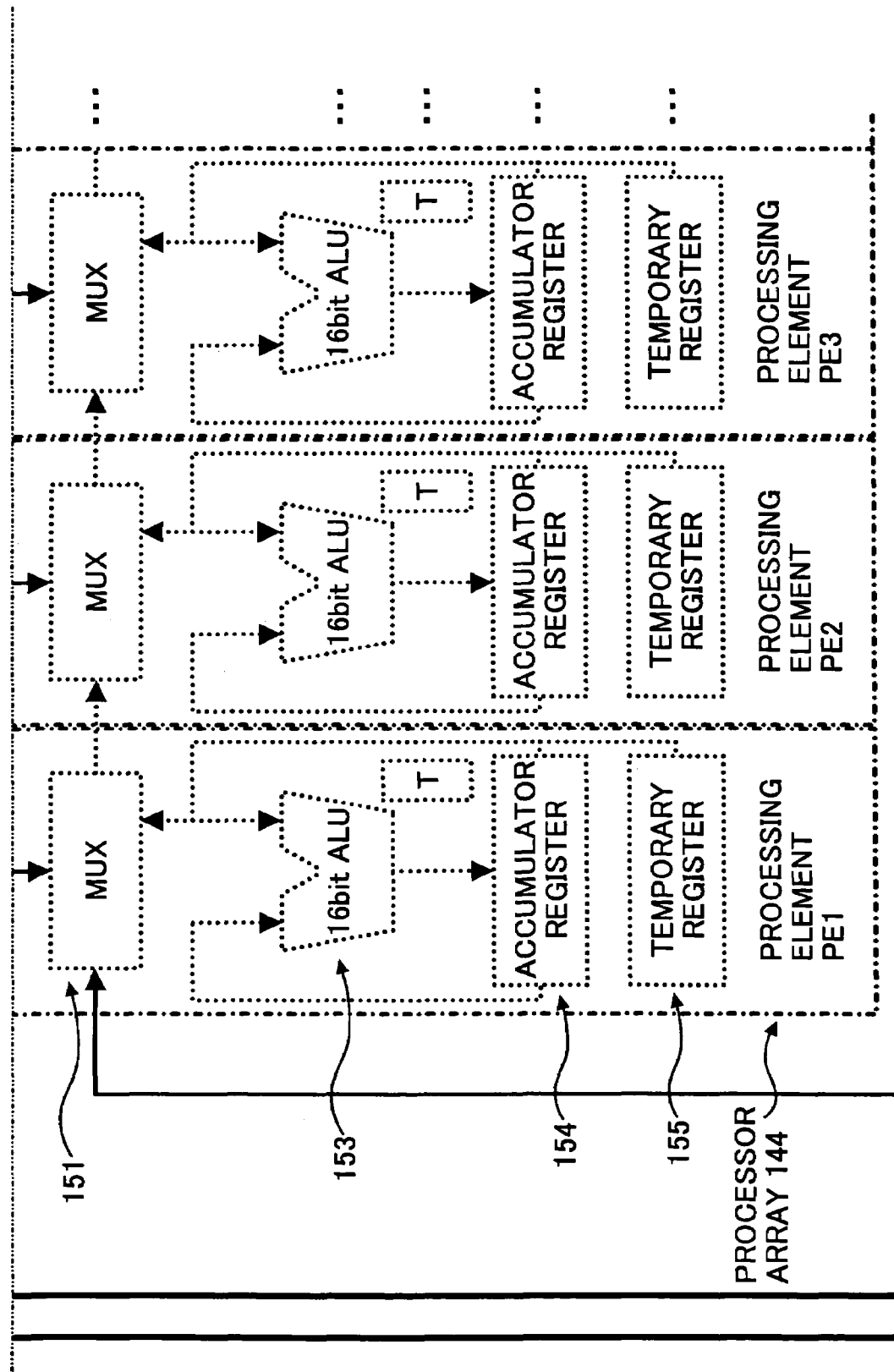
Figure 9C:
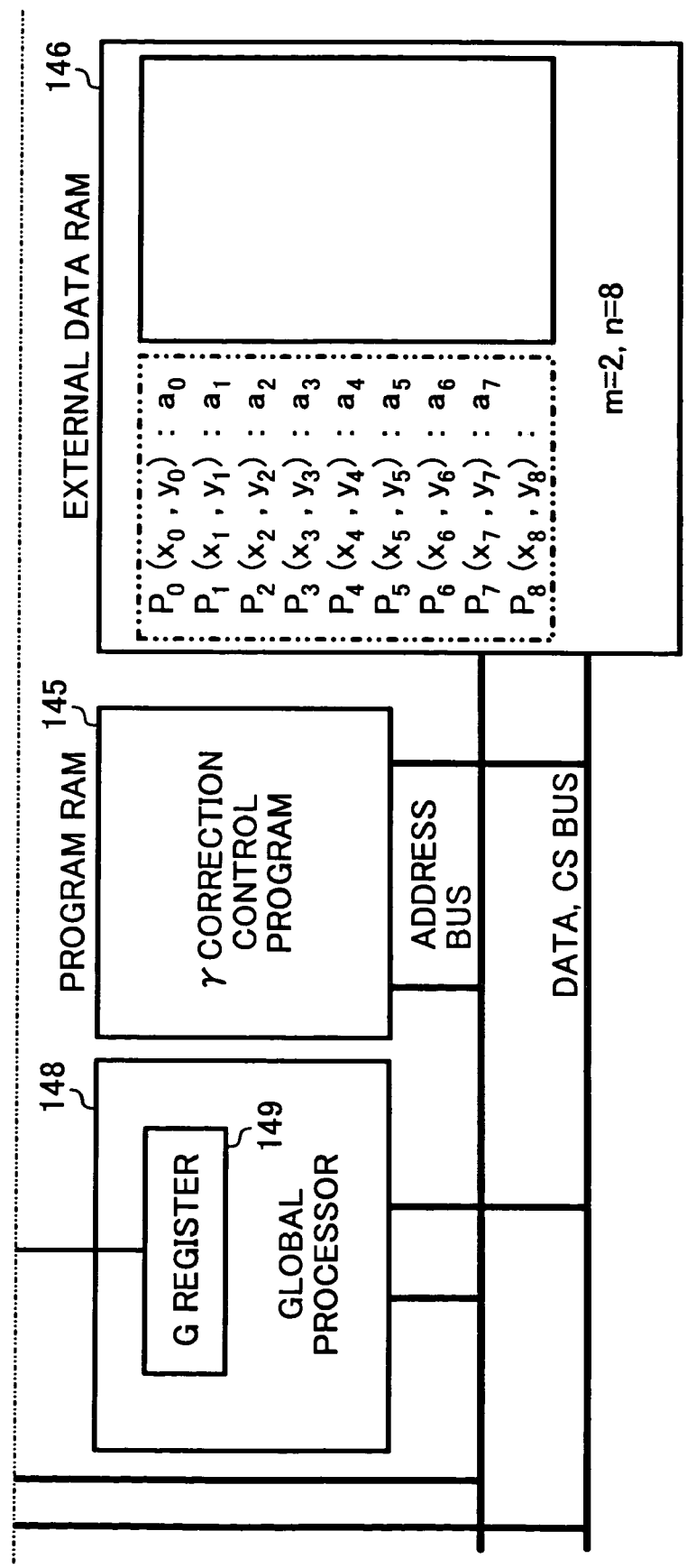

FIG. 9 is a diagrammatic block diagram illustrating the internal structure of a portion of the processor array 144.

The processor array 144 disclosed in the present embodiment is consisted of a group of SIMD (Single Instruction stream Multiple Data stream) type processing elements (PE), which is capable of executing one single instruction in parallel to plural sets of data and configured so that each processing element PE (PE1, PE2, PE3, . . . ) operates to process each set of the data.

Each processing element PE includes at least an input/output register 150, multiplexer (MUX) 151 for accessing the register connected to other PE, arithmetic logic unit (ALU) 153, accumulator register for storing logic results (hereinafter referred to as accumulator) 154, and temporary register 155 for temporarily sheltering the contents of the accumulator 154.

Each input/output register 150 is connected to address bus and data bus (read line and word line), and operates to store instruction codes for defining the process, the data to be processed and other similar data.

The contents of the input/output register 150 are input to ALU 153 and the results obtained from arithmetic processing are stored in the accumulator 154.

To be taken out from PE, the results are instructed to take shelter temporary in the register 155 and written into input/output register 150 (i.e., output register R5).

Subsequently, by sequentially (serially) outputting the resultant data from each PE, the processing results on presently concerned data are obtained in the raster (serial transfer) format.

By imparting instruction codes to each PE with the identical contents, transferring to respective PEs the concerned data different each other to be processed presently, and referring the contents in the input/output register 150 by means of MUX 151, each PE can carry out the operations referring the data to be processed held by other PEs.

The results obtained from the operation are output to the accumulator 154. All PEs carry out the same operation according to the same instruction code. Namely, they perform the parallel processing.

For example, by allocating the contents of one line of image data to the PE array such that one picture element corresponds to one PE and by carrying out simultaneous operations by one single instruction code, processing results for one line data can be obtained faster than the sequential processing for every picture element.

In particular, since the instruction code for each PE is operation expression itself for several processing such as spatial filtering, shading correction and attribute detection, process operations can be performed in common for all PEs.

The input/output register 150 includes at least plural 8-bit registers which are each data input enable from, and output enable to the exterior.

AUL 153 consists of 16-bit ALU unit which enables to load data from the input/output register 150 and to store operation results in the register 150. In addition, the accumulator 154 and temporary register 155 each consists of 16-bit units. Furthermore, each ALU includes T-register with 1-bit, which determines by its own whether the ALU executes program processing.

A plurality of thus constituted PEs is arranged in parallel to be operated again in parallel according to one single program.

By way of example, a description will be made herein below on the gamma-conversion, in which a group of image data of one block obtained from one raster scan is gamma-converted simultaneously on the assumption that the image data for one bit is converted by one PE.

Although this gamma-conversion is performed in the scanner gamma-conversion 194 (FIG. 7) and printer gamma-conversion 305 (FIG. 7), data sets for defining conversion characteristics different each other are utilized. These data sets for conversion characteristics definition and data conversion control programs to be operated on the data sets are registered in HDD.

In the case of reading document images with scanner 10, control programs for scanner image processing 190 including the scanner gamma-conversion 194 and pertinent data are readout from HDD and written into the program RAM 146 and external data RAM 145. Based on the data in the program. RAM 146 and external data RAM 145, a global processor 148 performs the scanner image processing 190 (FIG. 7).

In the case of printing out images with printer 100, control programs for printer image quality processing 300 (FIG. 7) including the printer gamma-conversion 305 and pertinent data are readout from HDD and written into the program RAM 146 and external data RAM 145. Based on the data in the program RAM 146 and external data RAM 145, the global processor 149 performs the printer image quality processing 300.

Further description will be made herein below on the gamma-conversion utilized in common for the scanner gamma-conversion 194 and printer gamma-conversion 305.

Figure 10B:
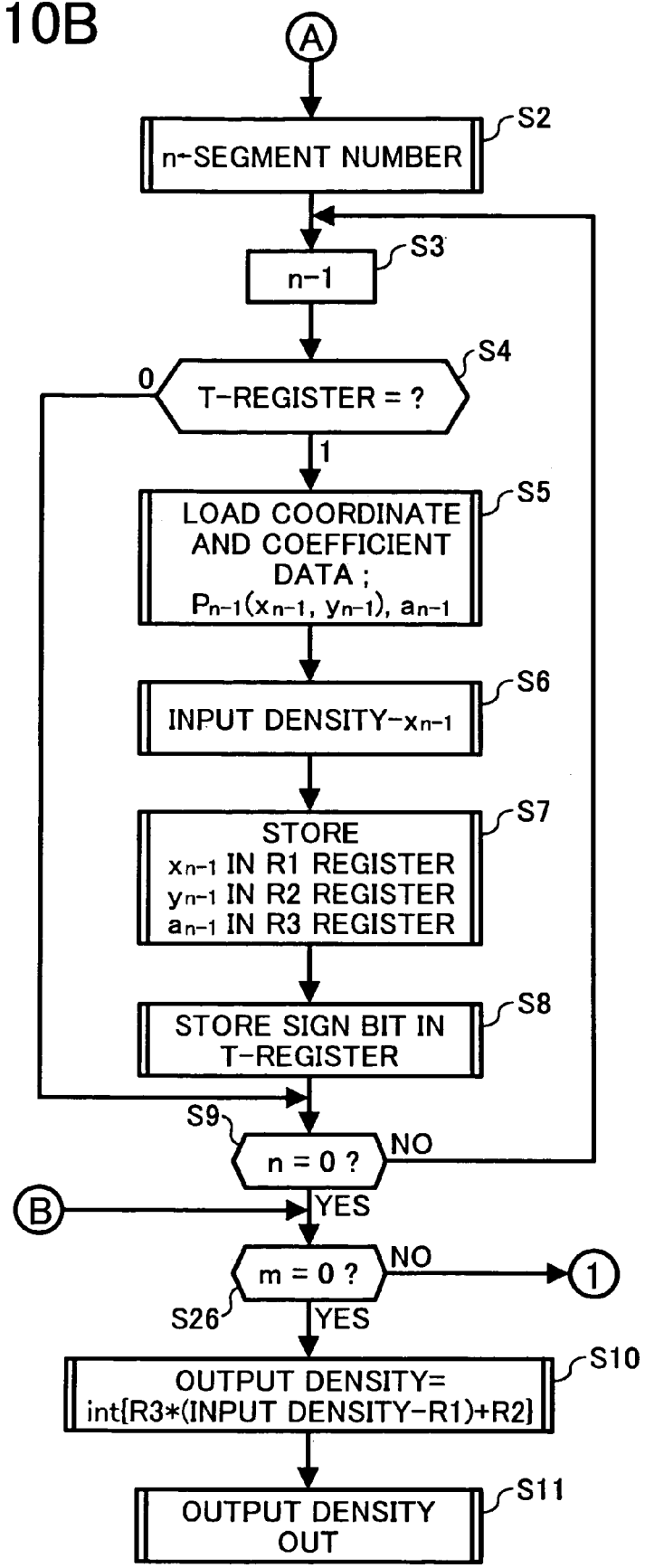

FIG. 10 includes a flow chart generally illustrating gamma-conversion processing control by the global processor 148 of FIGS. 8 and 9, in that this processing control is performed onto a group of image data, which appear along one line of pictorial image and have the length (or the number of data) suitable for enabling the concurrent operation by processor array 144 (i.e., one block).

In the beginning of the gamma-conversion processing control on image data group of one block, the global processor 148 instructs for each of image data in the image data group of one-block long to be written into the input image data register R0 included in each corresponding PE in the processor array 144 (step s1).

Incidentally, the number of the step may be abbreviated hereinafter as (s1) and so on.

Subsequently, the processor 148 instructs each PE in the processor array 144 to compute attribute data (attribute detection control) of image data contained in its register R0 (s21).

—Computation of Attribute Data (s21)—

In calculating attribute data (s21), this process is carried out such that the density difference is enhanced between the image data to be converted (noteworthy image data) and the image data assigned to the picture elements in the vicinity of the noteworthy image data (neighboring image data).

By way of example, weighing factors of spatial filter utilized for the above calculation are shown in FIG. 15D. The spatial filter presently used refers to several image data neighboring to the noteworthy image data CC, such as three data going to left from CC and further three data to right, L1~L3 and U1~U3, respectively. The convolution calculation is then performed after applying the weighing factors of FIG. 15D for each data at respective picture elements. That is, the weighing factors are given for the third image data toward left (L3): −3,
for the second image data toward left (L2): −2,
for the first image data toward left (L1): 2,
for the noteworthy image data (CC): 4
for the first image data toward right (R1): 2,
for the second image data toward right (R2): −2, and
for the third image data toward right (R3): −3.

Based on these weighing factors, the calculation is performed as follows for the noteworthy image data;

attribute characteristic value=$L3\times(-3)+L2\times(-1)+L1\times(2)+CC\times(4)+U1\times(2)+U2\times(-1)+U3\times(-3)$.

This attribute characteristic value indicates therefore how steep the change is in the noteworthy image data with respect to the neighboring image data for properly performing the calculation. The attribute data are given by quantizing (binarizing) the thus obtained characteristic value in comparison with, for example, 128 as the present threshold value. And, the number of quantization level (2) is called herein the attribute level number m.

In the present illustration, there assumed are
attribute characteristic value>128: attribute data="1"
attribute characteristic value≦128: attribute data="0".

For example, for the image data in the vicinity of the edge of character portion among image data group admixed with character and picture (photograph) data, a relatively large attribute characteristic value is obtained so that its attribute data become "1".

In contrast, for the image data in photographic picture portion where the gradation change is smoother, a small attribute characteristic value is obtained so that the attribute data become "0".

In general, for the character portion, gamma-conversion characteristics suitable for enhancing (clarifying) the edges of the characters are utilized, while those for suppressing the steep change in image density are used for the photograph portion.

In step s21 for calculating the attribute data, the global processor 148 first clears attribute all registers R4 of respective PEs.

Subsequently, the processor 148 instructs all PEs to perform sequentially several operations for computing the terms in the expression of the noted attribute characteristic value using MUX 151, ALU 153, accumulator 154 and temporary register 155, which are capable of selecting one of L3, L2, L1, CC, U1, U2, and U3.

These operations includes computing the first term 'L3×(−3)', computing the second term 'L2×(−1)' and adding resultant value for the first term 'L3×(−3)' computed as above, computing the third term 'L1×(2)' and adding the resultant value for the second term 'L3×(−3)+L2×(−1)' computed as above, and computing the seventh term 'L3×(−3)' and further adding the resultant value for the sixth term 'L3×(−3)+L2×(−1)+L1×(2)+CC×(4)+U1×(2)+U2×(−1)' computed as above.

Subsequently, from the resultant value added as above (i.e., attribute characteristic value), 128 is subtracted. If the result of this subtraction is positive, '1' is written into attribute register R4.

The processor 148 then instructs the external data RAM 146 to upload there from its data to all PEs, and also instructs all PEs to write an attribute level number m=2 and a segment number n=8, which are stored in the external data RAM, to attribute level number register RM and segment number register RN, respectively. Accordingly, the attribute level number m=2 and segment number n=8 are written into the attribute level number register RM and segment number register RN, respectively.

Thereafter, the processor 148 instructs all PEs to one-decrement (subtract one and newly store with the resultant value) the value in the attribute register RM (s23).

The data loaded in the attribute register RM is utilized for the data for assigning conversion characteristic definition data set in the external data RAM 146 corresponding to the attribute data. By sequentially decrementing, various conversion characteristic definition data sets are assigned sequentially corresponding to the attribute data.

Thereafter, respective PEs perform according to the comparison instruction from the processor 148, the comparison operation to determine whether the attribute data in attribute register R4 is equal to the value, one, as the resultant after subtracting one from the attribute level number m=2.

If the answer is affirmative (i.e., equal), '1' is written into T-register so as to enable the response to a conversion characteristic definition write command. In contrast, the answer is negative, '0' is written into T-register to disable the response to the command (s24).

Subsequently in step s25, the processor 148 performs operation parameter setting, in which, among the conversion characteristic definition data sets previously assigned to the attribute data set in step s23, the conversion characteristic definition data, that are assigned to the segment corresponding to the image data loaded in the input image data register R0, are written into characteristic registers R1~R3 according to steps s2 through s9, which will be described later on.

These operation parameter settings are carried out only for the PEs, each of which has the data '1' in its T-register.

The T-register operates such that only the ALUs having the data '1' in respective T-register enable the process instructed by the command from the global processor 148.

—Gamma-Conversion Expression—

Figure 15A:
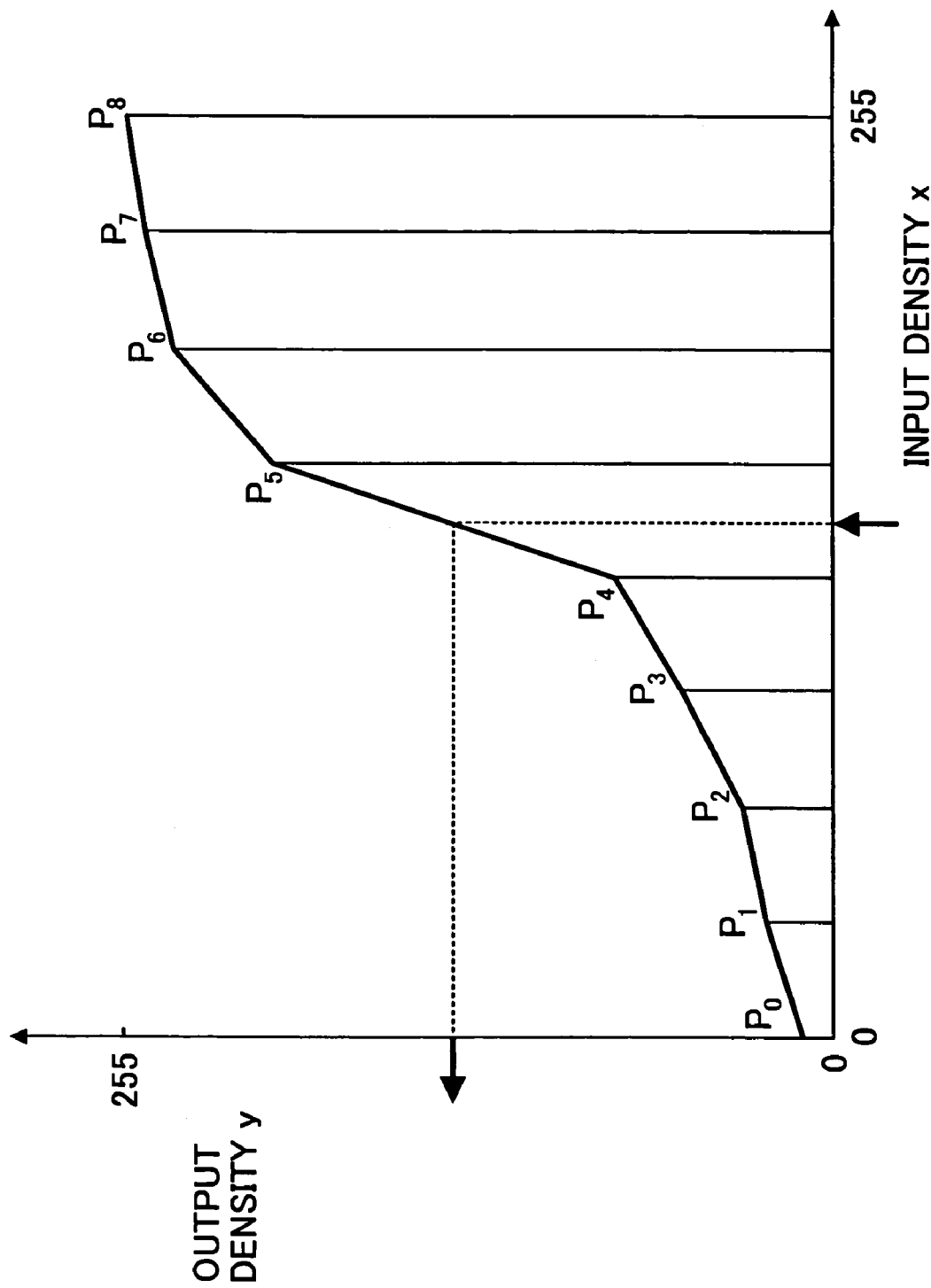
FIG. 15A is a drawing illustrating a polygonal line assumed for representing the input/output characteristic curve in use for gamma-conversion processing disclosed herein.

In the present embodiment, input/output characteristic curve is assumed to be a polygonal line, and its conversion expression is approximated by a linear equation such as, for example, illustrated in FIG. 15A.

Referring to FIG. 15A, the region of input/output data is arranged to be represented by eight-bit data, 0~255, and divided into the first segment ($P_0$~$P_1$) through the eighth segment ($P_7$~$P_8$).

For each segment of straight line for the polygonal line of FIG. 15A, conversion coefficients such as the coordinates, x and y, and the gradient are shown in FIG. 15B, where the x-axis corresponds to that of input data, while the y-axis corresponds to output data.

Those parameters shown in FIG. 15B illustrate the conversion characteristic definition data set noted earlier, and the two sets thereof, respectively assigned to the attribute data='1' and '0', are written into the external data RAM 146.

Among the conversion characteristic definition data sets, therefore, one data set $\{(x_i, y_i), a_i\}$ thereof such as, for example, $\{P_7(x_7, y_7), a_7\}$ are the conversion characteristic definition data assigned to a certain specific segment.

These conversion expressions will be explained in general herein below.

In the present embodiment, the gamma curve conventionally used is approximated by a set of linear equations each assigned to the m=8 segments formed by dividing the input density range.

There taken herein are the segment coordinates $P_i(x_i, y_i)$ and the coefficient of the approximated straight line $a_i$, where the coefficient $a_i$ is obtained from the coordinates of two closest neighboring points by the relationship, $(y_{n+1}-y_n)/(x_{n+1}-x_i)$.

Therefore, there obtained is output density=$a_n$(input density−$x_i$)+$y_n$, with the provision that the following relationship is used in the case when input density is to be quantized into 256 gradation, output density=$int\{a_n$(input density−$x_n$)+$y_n\}$, where the notation, int { ... } designates the integral number portion for the numeral included inside { }.

In addition, the noted 'output density' is represented by the data (y) after the conversion, while 'input density' is represented by the data (x) to be converted.

In order to properly perform the conversion using the above expressions, the coordinates and coefficient of the segment to which the input density (input image data) corresponds have to be specified. That is, this input density has to be specified which segment it belongs to.

—Setting Operation Parameters—

The processor 148 instructs all PEs to read the segment number data m=8, so that the segment number data m=8 loaded in the external data RAM 146 is written into the segment number register RN (s25, s2) only for the PEs with.

Thereafter, the processor 148 instructs all PEs to one-decrement the value in the segment number register RN (s3).

Since the segment number of m=8 is presently loaded as the initial value in the segment number register RN, there attained by sequentially decrementing by one are assigning the conversion characteristic definition data for the eighth segment, $\{P_7(x_7, y_7), a_7\}$;

assigning the data for the seventh segment, $\{P_6(x_6, y_6), a_6\}$;

assigning the data for the sixth segment, $\{P_5(x_5, y_5), a_5\}$;

. . .

. . .

assigning the data for the first segment, $\{P_0(x_0, y_0), a_0\}$; and switching the assignment of conversion characteristic definition data.

Following step s3, the processor 148 instructs all PEs to write the data loaded in the external data RAM 146 into the characteristic registers R1~R3. That is, only those PEs having the data '1' in respective T-registers operate to write into characteristic registers R1~R3 the conversion characteristic definition data $(x_{n-1}, y_{n-1}, a_{n-1})$ corresponding to the attribute number and segment number, which are set in the attribute number register RM and segment number register in steps s23 and s3.

Thereafter, the x-coordinate value $x_{n-1}$ in the conversion characteristic definition data is subtracted from the image data value (input density) in the input image data register.

If the resultant value is positive or zero, '0' is written into T-register, while '1' is written if the resultant is negative (s4~s8). These processes are repeated until the result of one-decrement (as in step s3)=0 is obtained.

During these steps, each ALU operates to transfer the x-coordinate data $x_{n-1}$ and coefficient $a_{n-1}$ corresponding to the segment number n following the (−1) subtraction in step s3, selected from the conversion characteristic definition data sets corresponding to the attribute number m following the (−1) subtraction in step s23, to coordinate registers, R1 and R2, and to the coefficient register R3, respectively, which are used by respective ALUs as the characteristic registers, by way of G-register 149 included in the global processor 148. The G-register 149 herein is capable of being accessed in common by all ALUs.

Subsequently, AUL 153 operates to subtract the x-coordinate value $x_{n-1}$ in the coordinate register R1 from the density value in the input image data register (s6). The thus used x-coordinate value $x_{n-1}$ and coefficient $a_{n-1}$ are written again into the coordinate and coefficient registers, respectively (s7). Thereafter, the sign bit from the computation is loaded in T-register (s8). These steps are repeated up to the point of n=0 (s9).

It should be added in the case where the sign bit=0 is obtained from the result of (input density−$x_n$) subtraction (i.e., the segment number for the present input density is specified), the thus identified ALUs instruct in step 4 to skip the following steps s6, s7 and s8, such that all of the PEs (including respective ALUs), to which input image data with the length of one block are allotted, each operate independently to store pertinent coordinate and coefficient data in characteristic registers R1, R2 and R3, respectively.

After specifying the segment for the value of input image data (input density) by repeating the loop s3~s9 for the segment number of times, if zero is obtained as the result from the decrement performed in step s23 (i.e., the forwarding control from external data RAM 146 with respect to all conversion characteristic definition data sets (two sets in the present embodiment) is completed), the processor 148 instructs (s10) all PEs to compute the term, int $\{a_n$(input density−$x_n$)+$y_n\}$, and gamma-converted image data (output density) of one-block long are output to the exterior (s11).

Example of Operator Parameter Setting

It is assumed that input image data herein have the eight-bit configuration and that the image density thereof ranging from 0 to 255 are divided into eight equal parts.

The control of operator parameter setting performed in the noted steps s1 through s9 will be detailed herein below in reference to FIGS. 11 through 14, in which the operator parameter setting is carried out on each of the image data included in one block of the above noted equally divided parts.

In this case, the data such as the attribute number m, segment number m, segment coordinate and coefficient are set in the external RAM 146 as illustrated in FIGS. 11 through 14.

Figure 11:
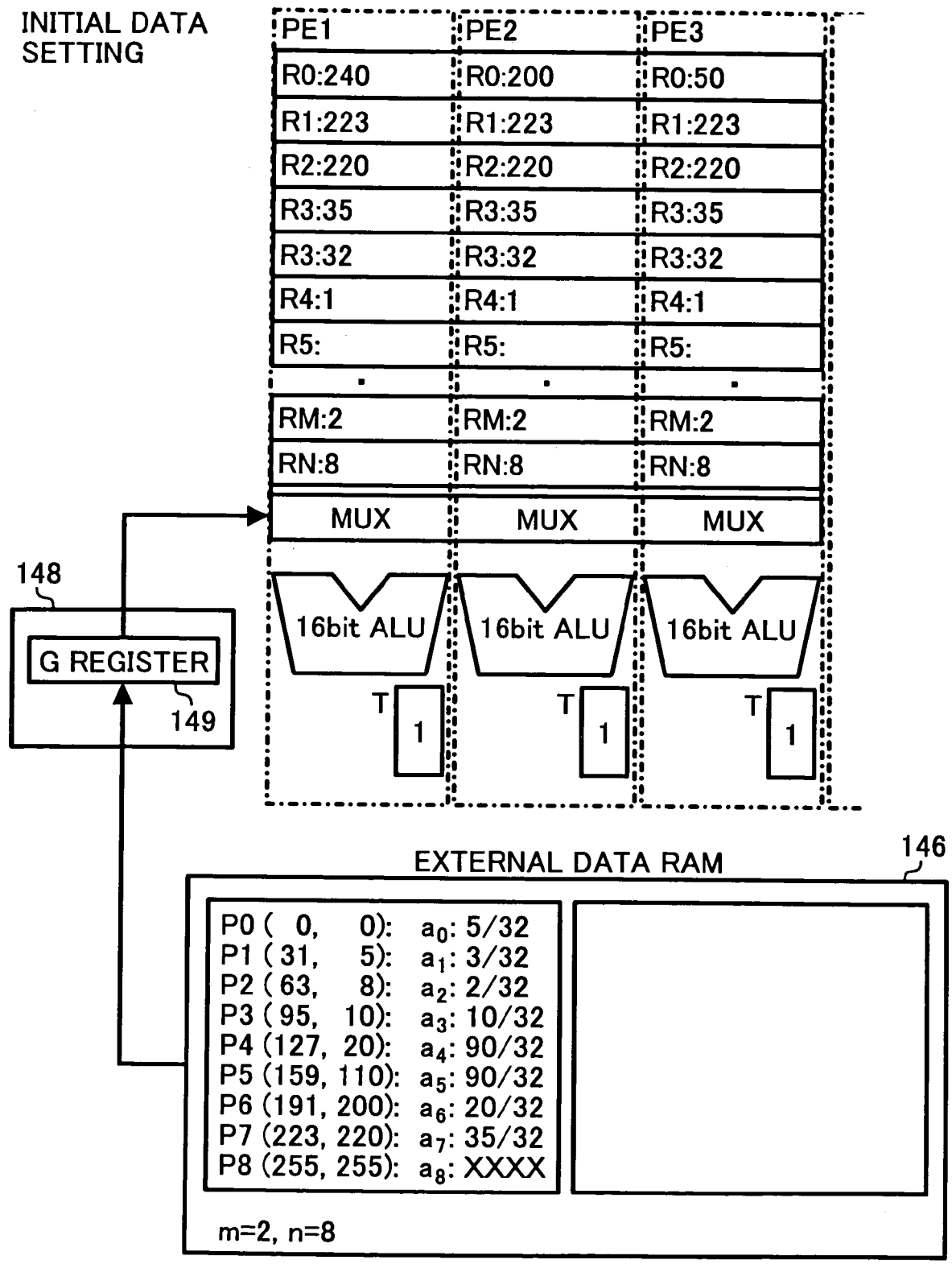
FIGS. 11 through 14 illustrate the steps for operator parameter setting control according one embodiment disclosed herein, in which the operator parameter setting is carried out on each of the image data included in one block of equally divided parts assumed that input image data have the eight-bit configuration and that the image density thereof ranging from 0 to 255 are divided into eight equal parts.
Figure 12:
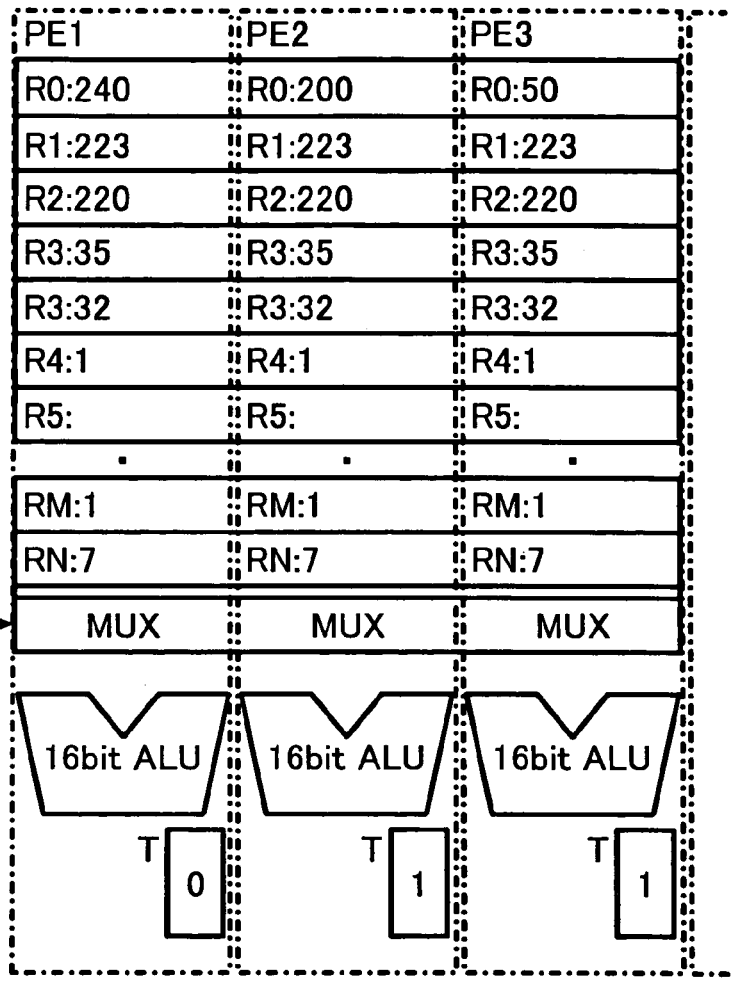
Figure 13:
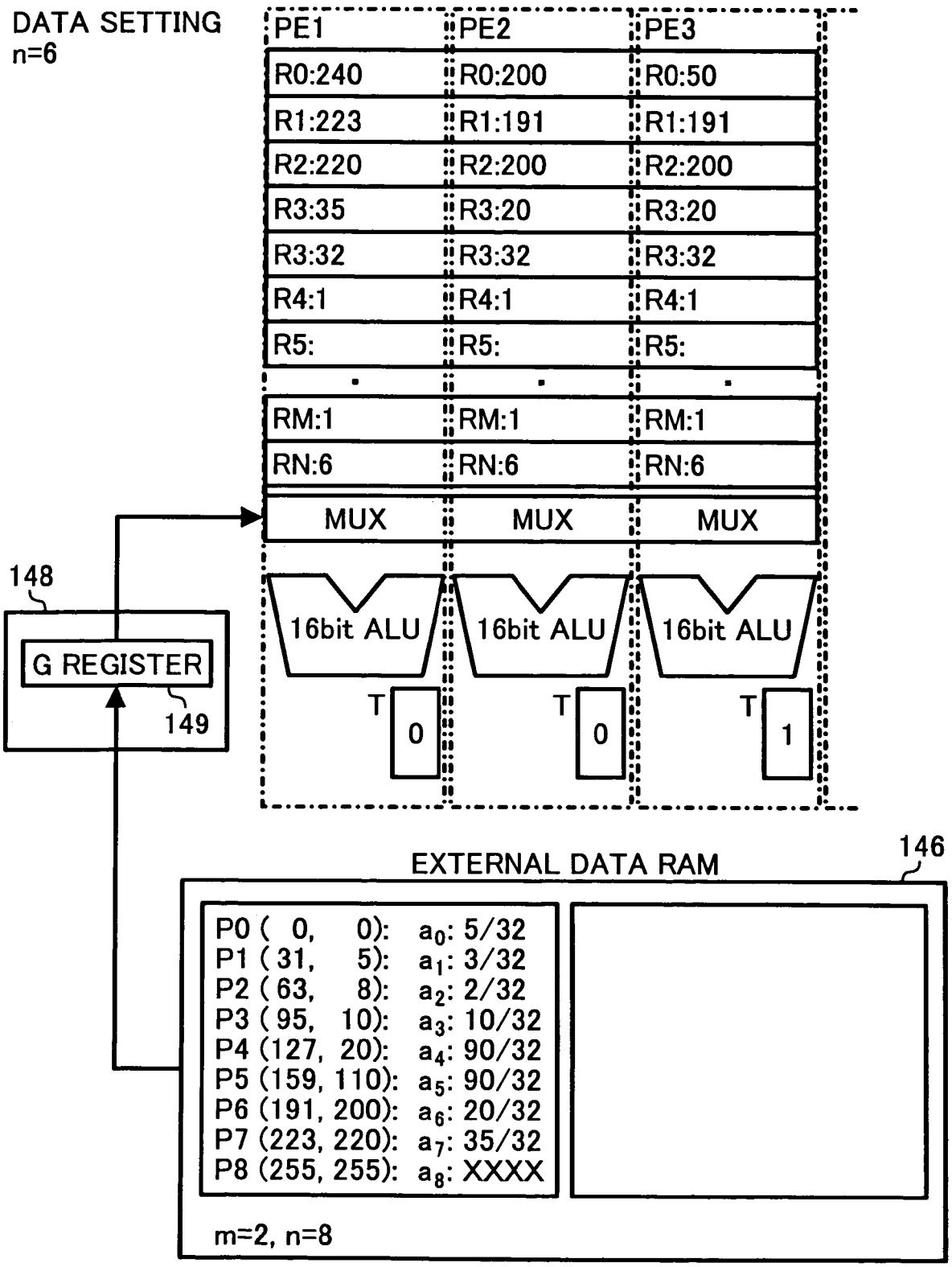

Assuming that the input image data into the processing elements, PE1, PE2 and PE3, are 240, 200 and 50, respectively, as given inside the frame of register R0 of FIG. 11, respective ALUs in PEs operate to load by way of the G register several data such as n=7, $x_7$=233, $y_7$=233 and operation coefficient $a_7$=35/32 as the gradient of the straight line between $P_7$ and $P_8$, previously loaded in own input image data register R0 and external data RAM 146, and subsequently subtract $x_7$=233 from input image data.

The result from the subtraction in PE 1 is obtained to be positive, PE1 operates to set '0' in T-register (FIG. 12) and the operations for n=6 or greater are suspended.

For the subtraction performed in PE2 and PE3, in contrast, the results are obtained as negative and PE2 and PE3 each operate to set '1' in T-register (FIG. 12) and the operations for n=6 or greater are carried out. In this case, the data in the external RAM 146 such as n=6, $x_6$=191, $y_6$=200, and $a_6$=20/32, are loaded by way of the G register, and subsequently carries out subtraction.

The result from the subtraction in the ALU of PE 2 is obtained to be positive, '0' is set in its T-register (FIG. 13), while '1' is set in the T-register included in the PE3.

Subsequently, since the T-register in the ALU of PE2 is loaded with '0', the operations for n=5 or greater are suspended. As a result, the characteristic registers R1, R2 and R3 are not be re-written, and the segment coordinate data $x_6$=191, $y_6$=200, and coefficient data $a_6$=20/32 are retained.

Figure 14:
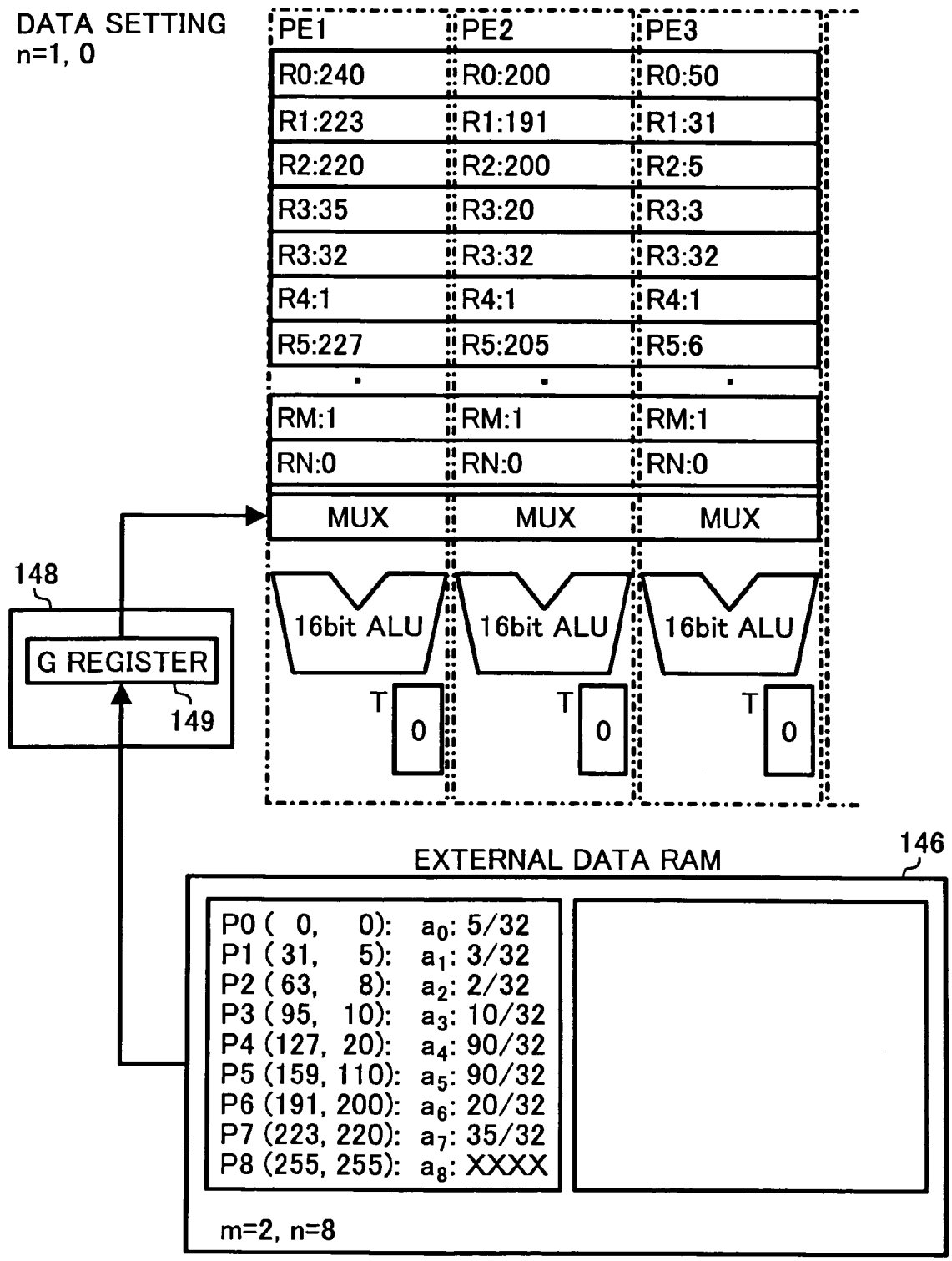

Subtracting processes until the cycle for n=1 are carried out only for the ALU of PE3, and R1=$x_1$, R2=$y_1$, and R3=$a_1$ are set into the characteristic registers R1, R2, and R3 of PE 3, respectively (FIG. 14).

After repeating these cycles up to n=1, each AUL simultaneously computes the value of int {R3 (R0-R1)+R2} and stores the resultant value in output image data register R5.

—Selecting Conversion Characteristics Corresponding to Attribute Data—

In selecting segment coordinates x and y, and coefficient data a, by examining the segments to which the input image density belongs according to the noted setting of operation parameters, ALU operates under the provision of T-register=1 to set the segment coordinates $x_i$ and $y_i$, and coefficient data $a_i$, which corresponds to the input density, from external data RAM into the characteristic registers R1, R2, and R3 of PE 3, respectively.

Similarly, T-register data are also used in the method for selecting conversion characteristics (conversion characteristic definition data set) according to the attribute of input image data.

That is, these processes are performed by successively switching the assignment of conversion characteristic definition data set in step s23, operating to set '1' into T-register only for the PEs, which are each loaded presently in its attribute register R4 with assigned attribute data applicable to the conversion characteristic definition data in s24, and subsequently in steps s25 and s2~s9, instructing only PEs, which are each loaded with '1' in its attribute register R4, to set into characteristic registers R1~R3 the conversion characteristic definition data ($x_{n-1}$, $y_{n-1}$, $a_{n-1}$), or operation parameters, which are assigned to the segments to which the input image density belongs, among the assigned conversion characteristic definition data set.

As indicted earlier, the attribute data of two kinds are included (attribute number m=2) in the present embodiment. Therefore, firstly, the conversion characteristic definition data set for the attribute data '1' are assigned in s23.

All ALU then operates to validate the attribute data in own attribute register R4. In the case of the attribute data of '1', '1' is set into the T-register, and '0' is set otherwise. Thereafter, the aforementioned steps (s3~s9) for setting operation parameters are carried out.

As a consequence, only PEs, which have attribute data=1, operate to set therein the operation parameters, which, are assigned to the segments to which the input image density belongs, among the conversion characteristic definition data set corresponding to the attribute data 1.

Then, the process returns from s26 to s23, where the conversion characteristic definition data set corresponding to the attribute data 0 are assigned.

All ALU then operates to validate the attribute data in own attribute register R4. In the case of the attribute data of '0', '1' is set into the T-register, and '0' is set otherwise. Thereafter, the aforementioned steps (s3~s9) for setting operation parameters are carried out.

As a result, only PEs, which have attribute data=0, operate to set therein the operation parameters in the segment to which the input image density belongs, among the conversion characteristic definition data set corresponding to the attribute data 0.

In the last result, by executing common conversion operation programs in all ALUs simultaneously (s10), all image data in the image data group of one-block long are gamma-converted all together by means of the conversion characteristics corresponding to respective attribute data.

EXAMPLE 2

In Example 1 detailed above, image characteristics i.e., either character or photographic picture, of the image represented by input image data are assumed through computation by processing element (PE) array 144, and the attribute data representing the image characteristics are computed by each PE on respective input image data and written into attribute register R4.

However, a further embodiment for processing images is also presented, in which attribute of the input image data is detected prior to the gamma conversion steps and then transferred along with the input image data.

In Example 2 of the present disclosure, an embodiment adapted for transferring the attribute with input image data. In the present embodiment, hard wares are the same as those of in Example 1, also the same are the data written into the external data RAM 146 (such as conversion characteristic definition data set, attribute number m and segment number n).

However, the gamma conversion program is slightly different such that there performed is the step of reading the attribute data (s21v) in place of the step of 'computing attribute data' (s21) included in Example 1.

Figure 16A:
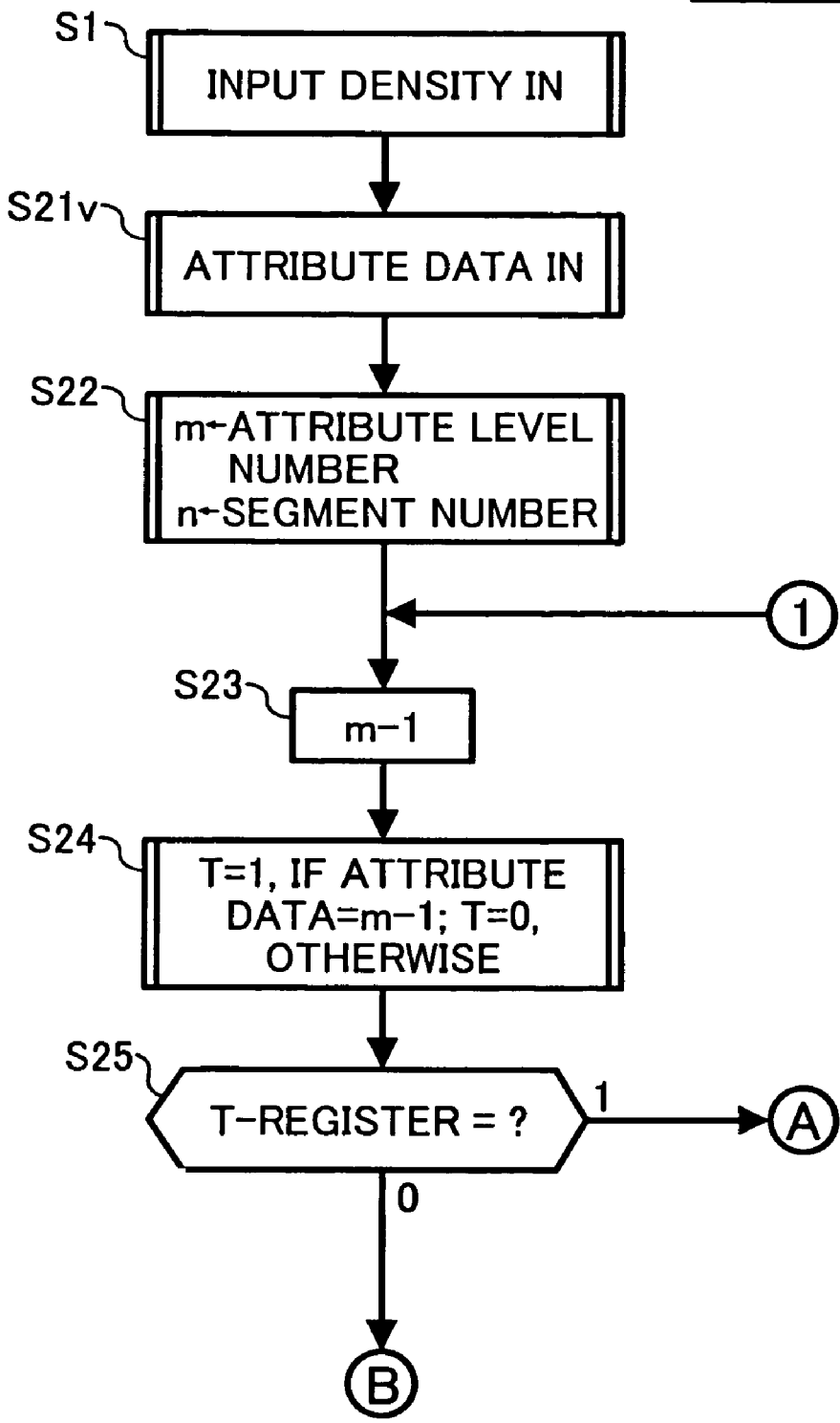
FIG. 16A, 16B includes a flow chart illustrating an outline of gamma conversion processing control carried out by the global processor 148 in which the step of 'computing attribute data' included in Example 1 is replaced herein with the step of 'attribute data in'.
Figure 16B:
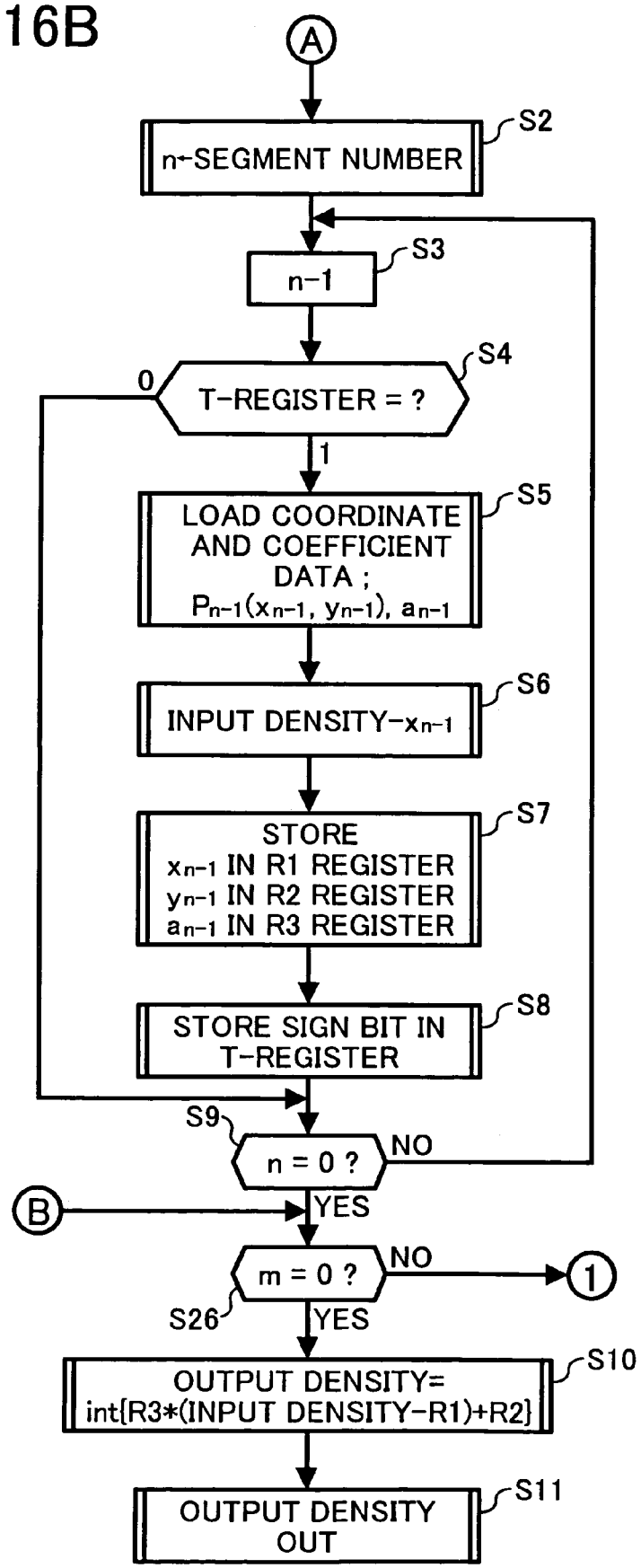

FIG. 16 includes a flow chart illustrating an outline of gamma conversion processing control carried out by the global processor 148, in which the step of 'computing attribute data' (s21) included in Example 1 is replaced herein with the step of 'attribute data IN'.

In this Example, in the beginning of the y-conversion processing control on image data group of one block, the global processor 148 instructs for each of image data in the image data group of one-block long to be written into the input image data register R0 included in each corresponding PE in the processor array 144 (s1).

In similar manner to the data input, each attribute in an attribute data group of one-block long is written into attribute register R4 (s21v).

The one-block long attribute data group is formed herein being composed of the attribute data for each of the aforementioned image data in the image data group of one-block long, transferred to IPP along with input image data, and written into local memory 142 included in IPP with input image block.

In step s1, the image data of one-block long are transferred from the local memory 142 to register R0 in the processor array 144. In step s21v, the attribute data group included in the attribute data block, which is assigned to the noted image data block, is transferred to the attribute register R4 in the processor array 144.

Following the writing the attribute data into the attribute register R4, the process proceeds in the same manner as Example 1 (s22 and so forth).

While the cases of the attribute number m=2 have been described in the examples, it is added the features noted above in Examples 1 and 2 are also applicable to the cases of detecting not only character/photographical picture but also more details such as colored/non-colored and on/inside/outside the edge, so that image character is expressed by attribute data of three or more bits of data construction (m being three or more).

It is apparent from the above description including example, the data conversion system disclosed herein has several advantages over similar systems previously known.

For example, by performing such controls in either one of the above examples as to sequentially forwarding conversion characteristic definition data simultaneously to respective characteristic registers R1~R3, even for the admixture of data having attributes different each other to be presently converted, data conversion becomes feasible corresponding to each attribute.

The setting of conversion characteristics by the processor 148 and arithmetic units 151~155 can be carried out with ease.

In addition, it is sufficient to prepare-in data memory the conversion characteristic definition data corresponding to respective attribute data, which are considerably smaller in data amount than LUTs. As a consequence, the amount of data and the size of memory required for the conversion are considerably reduced in comparison with those utilized with the LUTs.

Obviously, additional modifications and variations of the present invention are possible in light of the above teachings. It is therefore to be understood that within the scope of the appended claims, the invention may be practiced otherwise than as specifically described herein.

This document claims priority and contains subject matter related to Japanese Patent Application No. 2002-363595, filed with the Japanese Patent Office on Dec. 16, 2002, the entire contents of which are hereby incorporated by reference.

What is claimed is:

1. A data processing apparatus, comprising:
    a data memory configured to store characteristic definition data defined for at least one data attribute;
    a plurality of processing elements each configured to select a set of characteristic definition data from said characteristic definition data from a data stream to be processed and to process data from said data stream according to said set of characteristic definition data, wherein each processing element is configured to perform a same operation according to a same instruction code; and
    a process control apparatus configured to control at least one of:
        storing process control data for controlling said plurality of processing elements,
        imparting an operation instruction set based on said process control data to each of said plurality of processing elements in common,
        imparting said data stream to each of said plurality of processing elements,
        sending out said characteristic definition data stored in said data memory to each of said plurality of processing elements, and
        outputting processed data from each of said plurality of processing elements.

2. The data processing apparatus according to claim 1, wherein said process control apparatus includes:
    a global register configured to store and to impart said process control data to each of said plurality of processing elements in common, and
    a processor configured to control at least one of:
        writing said process control data into said global register,
        imparting said data stream to each of said plurality of processing elements,
        sending out said characteristic definition data stored in said data memory to each of said plurality of processing elements,
        imparting an operation instruction set based on said process control data to each of said plurality of processing elements in common, and
        outputting processed data from each of said plurality of processing elements.

3. The data processing apparatus according to claim 2, further comprising:
    a program memory configured to store a process program set for said processor to perform said control.

4. The data processing apparatus according to claim 2, wherein each of said plurality of processing elements includes:
    an input data register configured to store data to be processed;
    a plurality of character registers each configured to store said characteristic definition data;
    an output data register configured to store processed data acquired by processing;
    an attribute register configured to store attribute data for said data to be processed; and
    a calculator configured to select characteristic definition data to be stored in said character registers, said characteristic definition data being assigned to attribute data stored in said character registers among characteristic definition data corresponding to given attribute data, and to process said data to be processed according to an operation instruction set imparted by said processor based on said process control data and characteristic definition data stored in said character registers.

5. The data processing apparatus according to claim 4, wherein said processor is further configured to control at least one of:
    writing a data stream to be processed into said input data register included in each of said plurality of processing elements,
    sending out said characteristic definition data stored in said data memory corresponding to each attribute data to said character registers,
    writing said process control data into said global register, and
    outputting processed data from said output data register.

6. The data processing apparatus according to claim 5, wherein said processor is configured to control at least one of:
    sending out sequentially characteristic definition data corresponding to each attribute data from said data memory to said character registers based on said data written into said input data register, imparting an operation instruction set to said calculator based on said process control data, and outputting conversion processed data written into said output register by said calculator; and said calculator is configured, when said processor is sending out characteristic definition data corresponding to attribute data stored in said attribute register from said data memory, to load said characteristic definition data into said character registers, and to perform image data processing according to said operation instruction set using said characteristic definition data loaded in said character registers.

7. The data processing apparatus according to claim 6, wherein:

said characteristic definition data include input data obtained at a position in a divided segment, said divided segment being formed by dividing a data input range into multiple segments, into processed data obtained by processing said input data, and into process parameters for each of said multiple segments;

said processor is further configured, when sending out characteristic definition data corresponding to said each attribute data, to control sending out:

segmented position input image data assigned to said attribute data, processed data obtained by processing said segmented position input image data, and process parameters, sequentially in an order of said divided segment to said character registers from said data memory; and said calculator is configured, when said processor is sending out characteristic definition data, to:

load said segmented position input image data assigned to a segment corresponding to said data written into said input data register among said characteristic definition data corresponding to attribute data stored in said attribute register, processed data obtained by processing said segmented position input image data, and process parameters into said character registers, and perform data processing according to said operation instruction set on said data written into said input data register using said segmented position input image stored in said character registers, said processed data obtained by processing said segmented position input image data and said process parameters.

8. The data processing apparatus according to claim 4, wherein:

said data to be processed include image data, said global register is further configured to store attribute detection control data used for controlling data processing for generating attribute data of said image data by said plurality of processing elements, and to impart an operation instruction set in common to said plurality of processing elements, and said calculator is configured to generate and to subsequently store in said attribute register attribute data of said image data according to said operation instruction set, image data stored in said input data register, and image data assigned to picture elements in a vicinity of noteworthy image data.

9. A data processing apparatus, comprising:

a data memory configured to store characteristic definition data for defining characteristics of data processing for attribute data;

a global register configured to store a conversion program set;

a processor array comprising a plurality of processing elements, each of said plurality of processing elements including:

an input data register configured to store data to be conversion processed, a plurality of character registers each configured to store conversion characteristic definition data, an attribute register configured to store attribute data for said data to be conversion processed, an output data register configured to store processed data acquired by conversion processing, and a calculator configured to select a set of conversion characteristic definition data for subsequent storage in said character registers, said conversion characteristic definition data being assigned to attribute data stored in said character registers among conversion characteristic definition data corresponding to attribute data stored in said character registers, and to perform conversion processing on said data to be conversion processed according to a conversion operation instruction set based on said conversion control program and according to conversion characteristic definition data stored in said character registers;

a global processor configured to control at least one of:

writing a data stream to be conversion processed into said input data register included in each of said plurality of processing elements, sending out said conversion characteristic definition data to said character registers, imparting an operation instruction set based on said conversion process control program to each calculator in said plurality of processing elements in common, and outputting processed data from each of output registers; and a program memory configured to store a process program set for said global processor to perform said control.

10. An image data processing apparatus, comprising:

a data memory configured to store conversion characteristic definition data for defining gamma conversion characteristics of image data for each attribute of said image data;

a processor array comprising a plurality of processing elements, each of said plurality of processing elements including:

an input data register configured to store image data to be conversion processed, a plurality of character registers each configured to store gamma conversion characteristic definition data read out from said data memory, an attribute register configured to store attribute data describing image characteristics based on said image data, an output data register configured to store processed data acquired by conversion processing, and a calculator configured to generate and to subsequently store in said attribute register attribute data of image data stored in said input data register according to image data stored in said input data register and according to image data assigned to picture elements in a vicinity of noteworthy image data, and to perform conversion processing on said data to be conversion processed according to gamma conversion characteristic definition data stored in said plurality of character registers;
a global register configured to store attribute detection control data for controlling generation of said attribute control data in said calculator and of conversion control data for controlling said gamma conversion in said calculator;
a processor configured to control at least one of:
   writing image data on one raster into said input data register included in each of said plurality of processing elements,
   writing said attribute detection control data and said conversion control data into said global register,
   imparting an operation instruction set to said calculator based on said attribute detection control data,
   sending out said conversion characteristic definition data corresponding to each attribute data stored in said data memory to said character registers,
   imparting an operation instruction set to said calculator based on said conversion control data, and
   outputting conversion processed data from said output data register; and
a program memory configured to store a conversion program set for said processor to perform said control.

11. The image data processing apparatus according to claim 10, wherein said processor is configured to:
   control sequentially sending out characteristic definition data corresponding to said attribute data from said data memory to said plurality of character registers based on said data written into said input data register;
   impart an operation instruction set to said calculator based on conversion control data; and
   output conversion processed data written into said output register by said calculator,
   wherein said calculator is configured, when said processor is sending out characteristic definition data corresponding to attribute data stored in said attribute register from said data memory, to:
      load said conversion characteristic definition data into said plurality of character registers; and
      perform conversion processing according to said operation instruction set using said conversion characteristic definition data loaded in said plurality of character registers.

12. The image data processing apparatus according to claim 11, wherein:
   said conversion characteristic definition data corresponding to attribute data include input data obtained at a position in a divided segment, said divided segment being formed by dividing a conversion data input range into multiple segments, into processed data obtained by performing conversion processing on said input data, and into conversion parameters for each of said multiple segments,
   said processor is configured, when sending out conversion characteristic definition data corresponding to said attribute data, to control sending out segmented position input image data assigned to said attribute data, processed data obtained by performing conversion processing on said segmented position input image data, and process parameters, sequentially in an order of said divided segment from said data memory to said plurality of character registers; and
   said calculator is configured, when said processor is sending out characteristic definition data corresponding to attribute data stored in said attribute register from said data memory, to:
      load said segmented position input image data assigned to a segment corresponding to said data written into said input data register among said conversion characteristic definition data corresponding to attribute data stored in said attribute register, processed data obtained by performing conversion processing on said segmented position input image data, and process parameters into said plurality of character registers; and
      perform data processing according to said operation instruction set on said data written into said input data register using said segmented position input image stored in said character registers, said processed data obtained by processing said segmented position input image data, and said process parameters.

13. An image data processing apparatus, comprising:
   a data memory configured to store conversion characteristic definition data for defining gamma conversion characteristics of image data for each attribute of said image data;
   a global register configured to store an attribute detection control program for controlling generation of attribute data describing image characteristics of said image data and a conversion control program for controlling gamma conversion on said image data;
   a processor array comprising a plurality of processing elements, each of said plurality of processing elements including:
      an input data register configured to store image data to be conversion processed,
      a plurality of character registers each configured to store conversion characteristic definition data,
      an attribute register configured to store attribute data of said image data to be conversion processed,
      an output data register configured to store processed data acquired by conversion processing, and
      a calculator configured to:
         generate and subsequently store in said attribute register attribute data of image data stored in said input data register according to an operation instruction set to said calculator based on attribute detection control data stored in said global register, image data stored in said input data register, and image data assigned to picture elements in a vicinity of noteworthy image data,
         select and subsequently store in said attribute register conversion characteristic definition data assigned to attribute data stored in said character registers among conversion characteristic definition data corresponding to attribute data stored in said data memory, and
         perform gamma conversion processing on said data to be conversion processed stored in said input data register according to a conversion operation instruction set based on said conversion control program stored in said global register and conversion characteristic definition data stored in said character registers;
   a global processor configured to control at least one of:
      writing an image data stream into said input data register included in each of said plurality of processing elements,
      imparting an operation instruction set based on an attribute detection control program set stored in said global register to each calculator in said plurality of processing elements in common, sending out said conversion characteristic definition data corresponding to each attribute data stored in said data memory to said character registers, imparting a further operation instruction set based on a conversion control program stored in said global register to each calculator in said plurality of processing elements in common, and outputting conversion processed data from said output data register; and a program memory configured to store a global control program set for said global processor to perform said control.

14. An image processing apparatus, comprising:

an imaging apparatus configured to generate pictorial image data representing a pictorial image; and the image data processing apparatus according to claim 1 configured to perform picture gamma conversion of said pictorial image data for correcting image distortion caused during imaging.

15. The image processing apparatus according to claim 14, further comprising:

a parallel bus configured to transfer said pictorial image data;

a pictorial image memory;

a pictorial image memory control apparatus configured to write said pictorial image data on said parallel bus to be stored in said pictorial image memory, and to read out said pictorial image data stored in said pictorial image memory to be sent to said parallel bus; and a pictorial image data control apparatus configured to control an exchange of said pictorial image data among said imaging apparatus, said image data processing apparatus, and said parallel bus.

16. The image processing apparatus according to claim 15, wherein said pictorial image data control apparatus is configured to control selecting at least one of:

performing inelastic compression on said pictorial image data formed by said imaging apparatus to be output subsequently to said parallel bus, transforming said pictorial image data to said image data processing apparatus for processed pictorial image data to be performed with inelastic compression and subsequently output to said parallel bus, and decompressing said pictorial image data on said parallel bus to be transferred subsequently to said image data processing apparatus.

17. An image forming apparatus, comprising:

a printer configured to form a pictorial image represented by pictorial image data on a sheet; and an image data processing apparatus as recited in claim 1 configured to perform printer gamma conversion of said pictorial image data for forming image data suitably adapted to image formation by said printer.

18. The image forming apparatus according to claim 17, further comprising:

a parallel bus configured to transfer said pictorial image data;

a pictorial image memory;

a pictorial image memory control apparatus configured to write said pictorial image data on said parallel bus to be stored in said pictorial image memory, and to read out said pictorial image data stored in said pictorial image memory to be sent to said parallel bus; and a pictorial image data control apparatus configured to control an exchange of said pictorial image data between said image data processing apparatus and said parallel bus.

19. The image processing apparatus according to claim 17, wherein said pictorial image data control apparatus is configured to perform at least one of:

compressing said pictorial image data to be subsequently written into said image memory, and reading out said pictorial image data from said image memory to subsequently be decompressed, said pictorial image data being transferred between external units including at least one of a computer, local area network (LAN), a facsimile connected to said parallel bus, and said pictorial image data control apparatus.

20. An image forming apparatus, comprising:

an imaging apparatus configured to generate pictorial image data representing a pictorial image; and an image data processing apparatus as recited in claim 1 configured to perform data conversion of said pictorial image data for forming images to form images on a sheet by a printer, said printer being configured to form a pictorial image on said sheet.

21. The image forming apparatus according to claim 20, further comprising:

a parallel bus configured to transfer said pictorial image data;

a pictorial image memory;

a pictorial image memory control apparatus configured to write said pictorial image data on said parallel bus to be stored in said pictorial image memory, and to read out said pictorial image data stored in said pictorial image memory to be sent to said parallel bus; and a pictorial image data control apparatus configured to control an exchange of said pictorial image data among said imaging apparatus, said image data processing apparatus, and said parallel bus.

22. The image processing apparatus according to claim 20, wherein said pictorial image data control apparatus is configured to perform at least one of:

compressing said pictorial image data to be subsequently written into said image memory; and reading out said pictorial image data from said image memory to subsequently be decompressed, said pictorial image data being transferred between external units, including at least one of a computer, a local area network (LAN), a facsimile connected to said parallel bus, and said pictorial image data control apparatus.

23. A data processing apparatus, comprising:

first means for storing characteristic definition data defined for each data attribute;

a plurality of first means for selecting a set of characteristic definition data from said characteristic definition data stored in said first means for storing corresponding to each data and each data attribute out of a data stream to be processed, and for processing said data according to said set of characteristic definition data, wherein each of the plurality of first means for selecting performs a same operation according to a same instruction code; and second means for storing process control data for controlling said processing of said each data, for imparting an operation instruction set based on said process control data to said first means for selecting in common, for imparting each of said data stream to each of said means for selecting, for sending out said characteristic definition data stored in said first means for storing corresponding to said each attribute data stored in said first means for storing for each of first said means for selecting, and for outputting processed data from said first means for selecting.

24. The data processing apparatus according to claim 23, wherein said second means for storing includes:
third means for storing and for imparting said process control data for controlling said processing of said data to said plurality of first means for selecting in common, and
means for controlling at least one of:
writing said process control data into said third means for storing,
imparting each of said data stream to said plurality of first means for selecting,
sending out said characteristic definition data stored in said first means for storing corresponding to each data attribute stored in said first means for storing to said plurality of first means for selecting,
imparting an operation instruction set based on said process control data to said plurality of first means for selecting in common, and
outputting processed data from said plurality of first means for selecting.

25. The data processing apparatus according to claim 24, further comprising:
fourth means for storing a process program set for said means for controlling to perform said control.

26. The data processing apparatus according to claim 24, wherein each of said plurality of first means for selecting includes:
fifth means for storing data to be processed;
sixth means for storing said characteristic definition data;
seventh means for storing processed data acquired by processing;
eighth means for storing attribute data for said data to be processed; and
second means for selecting characteristic definition data and for storing said selected characteristic definition data in said sixth means for storing, said characteristic definition data being assigned to an attribute data stored in said eighth means for storing among characteristic definition data corresponding to given attribute data, and for processing said data to be stored in said fifth means for storing according to an operation instruction set imparted by said means for controlling based on said process control data and characteristic definition data stored in said fifth means for storing.

27. The data processing apparatus according to claim 26, wherein said means for controlling controls at least one of:
writing a data stream to be processed into said fifth means for storing included in said plurality of first means for selecting,
sending out said characteristic definition data stored in said first means for storing corresponding to each attribute data to said sixth means for storing,
writing said process control data into said third means for storing, and
outputting processed data from said seventh means for storing.

28. The data processing apparatus according to claim 27, wherein said means for controlling controls at least one of:
sequentially sending out characteristic definition data corresponding to each attribute data from said first means for storing to said sixth means for storing based on said data written into said fifth means for storing,
imparting an operation instruction set to said second means for selecting based on process control data, and
outputting conversion processed data written into said seventh means for storing by said second means for selecting; and
said second means for selecting, when said means for controlling is sending out characteristic definition data corresponding to attribute data stored in said eighth means for storing from said first means for storing, loads said characteristic definition data into said sixth means for storing, and performs image data processing according to said operation instruction set using said characteristic definition data loaded in said sixth means for storing.

29. The data processing apparatus according to claim 28, wherein:
said characteristic definition data corresponding to attribute data include input data obtained at a position in a divided segment, said divided segment being formed by dividing a data input range into multiple segments, processed data obtained by processing said input data, and process parameters for each of said multiple segments;
said means for controlling controls, when sending out characteristic definition data corresponding to each attribute data, sending out segmented position input image data assigned to said attribute data, processed data obtained by processing said segmented position input image data, and process parameters, sequentially in an order of said divided segment to said sixth means for storing from said first means for storing; and
said second means for selecting, when said means for controlling is sending out from said first means for storing:
loads said segmented position input image data assigned to a segment corresponding to said data written into said fifth means for storing among said characteristic definition data corresponding to attribute data stored in said eighth means for storing, processed data obtained by processing said segmented position input image data, and process parameters, into said sixth means for storing; and
performs data processing according to said operation instruction set on said data written into said fifth means for storing using said segmented position input image stored in said sixth means for storing, said processed data obtained by processing said segmented position input image data, and said process parameters.

30. The data processing apparatus according to claim 26, wherein:
said data to be processed include image data;
said third means for storing stores attribute detection control data used for controlling data processing for generating attribute data of said image data by said plurality of first means for selecting, and imparts an operation instruction set in common to said plurality of first means for selecting; and
said second means for selecting generates, and subsequently stores in said eighth means for storing attribute data of image data stored in said fifth means for storing according to said operation instruction set, image data stored in said fifth means for storing, and image data assigned to picture elements in a vicinity of noteworthy image data.

31. A data processing apparatus, comprising:
first means for storing characteristic definition data for defining characteristics of data processing for attribute data;
second means for storing for storing a conversion program set;

a plurality of means for processing, including:
third means for storing data to be conversion processed,
fourth means for storing conversion characteristic definition data,
sixth means for storing attribute data for said data to be conversion processed,
fifth means for storing processed data acquired by conversion processing, and
first means for selecting a set of conversion characteristic definition data to be subsequently stored in said fourth means for storing, said conversion characteristic definition data being assigned to attribute data stored in said fourth means for storing among conversion characteristic definition data corresponding to attribute data stored in said fourth means for storing, and for performing conversion processing on said data to be conversion processed stored in said third means for storing according to a conversion operation instruction set based on said conversion control program and to conversion characteristic definition data stored in said fourth means for storing;
means for controlling writing a data stream to be conversion processed into said third means for storing included in said means for processing, for sending out said conversion characteristic definition data stored in said first means for storing corresponding to said attribute data to said fourth means for storing, imparting an operation instruction set based on said conversion process control program stored in said second means for storing to said first means for selecting in common, and outputting processed data from each of said third means for storing; and
seventh means for storing a process program set for said means for controlling to perform said control.

32. An image data processing apparatus, comprising:
first means for storing conversion characteristic definition data for defining gamma conversion characteristics of image data for each attribute of said image data;
a plurality of means for processing, each including:
second means for storing image data to be conversion processed,
third means for storing gamma conversion characteristic definition data read out from said first means for storing,
fourth means for storing attribute data describing image characteristics revealed by said image data,
fifth means for storing processed data acquired by conversion processing, and
means for generating and for subsequently storing in said fourth means for storing attribute data of image data stored in said second means for storing according to image data stored in said second means for storing and according to image data assigned to picture elements in a vicinity of noteworthy image data, and for conversion processing said data to be conversion processed stored in said second means for storing according to gamma conversion characteristic definition data stored in said third means for storing;
sixth means for storing attribute detection control data for controlling generation of said attribute data in said means for generating and for storing conversion control data for controlling said gamma conversion in said means for generating;
means for controlling at least one of:
writing image data on one raster into said second means for storing;
writing said attribute detection control data and said conversion control data into said sixth means for storing,
imparting an operation instruction set to said means for generating based on said attribute detection control data,
sending out said conversion characteristic definition data corresponding to each attribute data stored in said first means for storing to said third means for storing,
imparting an operation instruction set to said means for generating based on said conversion control data, and
outputting conversion processed data from said fifth means for storing; and
seventh means for storing a conversion program set for said means for controlling to perform said control.

33. The image data processing apparatus according to claim 32, wherein said means for controlling controls at least one of:
sending out sequentially characteristic definition data corresponding to each attribute data from said first means for storing to said third means for storing based on said data written into said second means for storing,
imparting an operation instruction set to said means for generating based on conversion control data, and
outputting conversion processed data written into said fifth means for storing by said means for generating,
wherein said means for generating, when said means for controlling is sending out characteristic definition data corresponding to attribute data stored in said fourth means for storing from said first means for storing, loads said conversion characteristic definition data into said third means for storing and performs conversion processing according to said operation instruction set using said conversion characteristic definition data loaded in said third means for storing.

34. The image data processing apparatus according to claim 33, wherein:
said conversion characteristic definition data corresponding to attribute data include input data obtained at a position in a divided segment, said divided segment being formed by dividing a conversion data input range into multiple segments, into processed data obtained by performing conversion processing on said input data, and into conversion parameters for each of said multiple segments;
said means for controlling controls, when sending out conversion characteristic definition data corresponding to each attribute data, sending out segmented position input image data assigned to said attribute data, processed data obtained by performing conversion processing on said segmented position input image data, and process parameters, sequentially in an order of said divided segment from said first means for storing to said third means for storing, and
wherein said means for generating, when said means for controlling is sending out from said first means for storing:
loads said segmented position input image data assigned to a segment corresponding to said data written into said second means for storing among said conversion characteristic definition data corresponding to attribute data stored in said fourth means for storing, processed data obtained by performing conversion processing on said segmented position input image data, and process parameters, into said third means for storing; and performs data processing according to said operation instruction set on said data written into said second means for storing using said segmented position input image stored in said third means for storing, said processed data obtained by processing said segmented position input image data, and said process parameters.

35. An image data processing apparatus, comprising:

first means for storing conversion characteristic definition data for defining gamma conversion characteristics of image data for each attribute of said image data;

second means for storing an attribute detection control program for controlling a generation of attribute data describing image characteristics related to said image data and a conversion control program for controlling gamma conversion on said image data;

a plurality of means for processing, each including:
third means for storing image data to be conversion processed,
fourth means for storing conversion characteristic definition data,
fifth means for storing attribute data of said image data to be conversion processed,
sixth means for storing processed data acquired by conversion processing, and
means for generating and for subsequently storing in said fifth means for storing, attribute data of image data stored in said third means for storing according to an operation instruction set to said for generating based on attribute detection control data stored in said second means for storing, image data stored in said third means for storing, and image data assigned to picture elements in a vicinity of noteworthy image data, for selecting and for subsequently storing in said fifth means for storing conversion characteristic definition data assigned to attribute data stored in said fourth means for storing among conversion characteristic definition data corresponding to attribute data stored in said first means for storing, and for performing gamma conversion processing on said data to be conversion processed stored in said third means for storing according to a conversion operation instruction set based on said conversion control program stored in said second means for storing and conversion characteristic definition data stored in said fourth means for storing;

means for controlling at least one of:
writing an image data stream into said third means for storing,
imparting an operation instruction set based on an attribute detection control program set stored in said second means for storing to each calculator in common,
sending out said conversion characteristic definition data corresponding to each attribute data stored in said first means for storing to said fourth means for storing,
imparting a further operation instruction set based on said conversion control program stored in said second means for storing to each calculator in common, and
outputting conversion processed data from said sixth means for storing; and eighth means for storing a global control program set for said means for controlling to perform said control.

36. An image processing apparatus, comprising:
an imaging apparatus configured to generate pictorial image data representing a pictorial image; and
the image data processing apparatus recited in claim 1, configured to perform picture gamma conversion of said pictorial image data for correcting image distortion caused during imaging.

37. The image processing apparatus according to claim 36, further comprising:
a parallel bus configured to transfer said pictorial image data;
a pictorial image memory;
a pictorial image memory control apparatus configured to write said pictorial image data on said parallel bus to be stored in said pictorial image memory, and to read out said pictorial image data stored in said pictorial image memory to be sent to said parallel bus; and
a pictorial image data control apparatus configured to control an exchange of said pictorial image data among said imaging apparatus, said image data processing apparatus, and said parallel bus.

38. The image processing apparatus according to claim 37, wherein said pictorial image data control apparatus is configured to control at least one of:
performing inelastic compression on said pictorial image data formed by said imaging apparatus to be output subsequently to said parallel bus,
transferring said pictorial image data to said image data processing apparatus to process said pictorial image data with inelastic compression and to subsequently output said pictorial image data to said parallel bus, and
decompressing said pictorial image data on said parallel bus to subsequently transfer said pictorial image data to said image data processing apparatus.

39. An image forming apparatus, comprising:
a printer configured to form a pictorial image represented by pictorial image data on a sheet; and
the image data processing apparatus recited in claim 1 configured to perform printer gamma conversion of said pictorial image data for forming image data for use in record outputting adapted to image formation by said printer.

40. The image forming apparatus according to claim 39, further comprising:
a parallel bus for transferring said pictorial image data;
a pictorial image memory;
a pictorial image memory control apparatus configured to write said pictorial image data on said parallel bus to be stored in said pictorial image memory and to read out said pictorial image data stored in said pictorial image memory to be sent to said parallel bus; and
a pictorial image data control apparatus configured to control an exchange of said pictorial image data between said image data processing apparatus and said parallel bus.

41. The image processing apparatus according to claim 39, configured to perform at least one of:
compressing said pictorial image data to be subsequently written into said image memory, and
reading out said pictorial image data from said image memory to subsequently be decompressed,
said pictorial image data being transferred between external units, including at least one of a computer, a local area network (LAN), a facsimile connected to said parallel bus, and said pictorial image data control apparatus.

42. An image forming apparatus, comprising:

an imaging apparatus configured to generate pictorial image data representing a pictorial image; and the image data processing apparatus recited in claim 1 configured to perform data conversion of said pictorial image data for forming images for use in record outputting to form images on a sheet by a printer, said printer being configured to form a pictorial image represented by said images on said sheet.

43. The image forming apparatus according to claim 42, further comprising:

a parallel bus configured to transfer said pictorial image data;

a pictorial image memory;

a pictorial image memory control apparatus configured to write said pictorial image data on said parallel bus to be stored in said pictorial image memory, and to read out said pictorial image data stored in said pictorial image memory to be sent to said parallel bus; and a pictorial image data control apparatus configured to control an exchange of said pictorial image data among said imaging apparatus, said image data processing apparatus, and said parallel bus.

44. The image processing apparatus according to claim 42, configured to perform at least one of:

compressing said pictorial image data to be subsequently written into said image memory, and reading out said pictorial image data from said image memory to subsequently be decompressed, said pictorial image data being transferred between external units, including at least one of a computer, a local area network (LAN), a facsimile connected to said parallel bus, and said pictorial image data control apparatus.

* * * * *